(12) United States Patent
Jiang

(10) Patent No.: US 12,677,348 B2
(45) Date of Patent: Jul. 7, 2026

(54) DISCONTINUOUS RECEPTION DETERMINING METHOD AND DEVICE, COMMUNICATION DEVICE, AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 299 days.

(21) Appl. No.: 18/277,918

(22) PCT Filed: Feb. 22, 2021

(86) PCT No.: PCT/CN2021/077301
§ 371 (c)(1),
(2) Date: Aug. 18, 2023

(87) PCT Pub. No.: WO2022/174457
PCT Pub. Date: Aug. 25, 2022

(65) Prior Publication Data
US 2024/0138020 A1 Apr. 25, 2024
US 2024/0237132 A9 Jul. 11, 2024

(51) Int. Cl.
*H04W 76/28* (2018.01)

(52) U.S. Cl.
CPC .................................. *H04W 76/28* (2018.02)

(58) Field of Classification Search
None
See application file for complete search history.

(56) References Cited

U.S. PATENT DOCUMENTS

2009/0180414 A1* 7/2009 Maeda ................. H04B 7/2643
370/311
2018/0343686 A1* 11/2018 Manepalli ............. H04W 76/28
(Continued)

FOREIGN PATENT DOCUMENTS

CN 102387492 A 3/2012
CN 103391600 A 11/2013
(Continued)

OTHER PUBLICATIONS

Chinese Patent Application No. 202180000559.2 Office Action with English translation dated Apr. 16, 2025, 19 pages.
(Continued)

*Primary Examiner* — Jamaal Henson
(74) *Attorney, Agent, or Firm* — Cozen O'Connor

(57) ABSTRACT

A method for determining a discontinuous reception (DRX) includes: sending configuration information of the DRX to a user equipment. A specified DRX cycle value contained in the configuration information is different from any one of default configurable DRX cycle values. The specified DRX cycle value may be determined in each subcarrier spacing (SCS) according to time domain resource allocation information corresponding to each SCS or may be based on the specified DRX cycle value in a specified SCS. In some methods, the specified DRX cycle value may be determined according to an arrival time interval of any one of service data, wherein the arrival time interval of the any one of the service data is different from any one of the default configurable DRX cycle values.

20 Claims, 7 Drawing Sheets sending configuration information of a DRX to a UE, wherein a specified DRX cycle value contained in the configuration information is different from any one of default configurable DRX cycle values

— 101

(56)                References Cited

U.S. PATENT DOCUMENTS

| 2019/0053159 A1 | 2/2019 | Wei et al. | |
|---|---|---|---|
| 2020/0351026 A1* | 11/2020 | Babaei | H04L 1/1835 |
| 2020/0359316 A1* | 11/2020 | Shi | H04W 52/0229 |
| 2022/0124614 A1* | 4/2022 | Wong | H04W 76/28 |
| 2023/0363048 A1* | 11/2023 | Park | H04W 28/0268 |

FOREIGN PATENT DOCUMENTS

| CN | 103546925 A | 1/2014 |
|---|---|---|
| CN | 110167141 A | 8/2019 |
| EP | 3579621 A1 | 12/2019 |
| EP | 3780760 A1 | 2/2021 |
| WO | WO 2020/089472 A1 | 5/2020 |

OTHER PUBLICATIONS

European Patent Application No. 21926174.0 Search Report dated Apr. 2, 2024, 9 pages.
PCT/CN2021/077301, International Search Report dated Nov. 9, 2021, 2 pages.
Indian Patent Application No. 202347059611 Office Action dated Nov. 25, 2024, 5 pages.

* cited by examiner

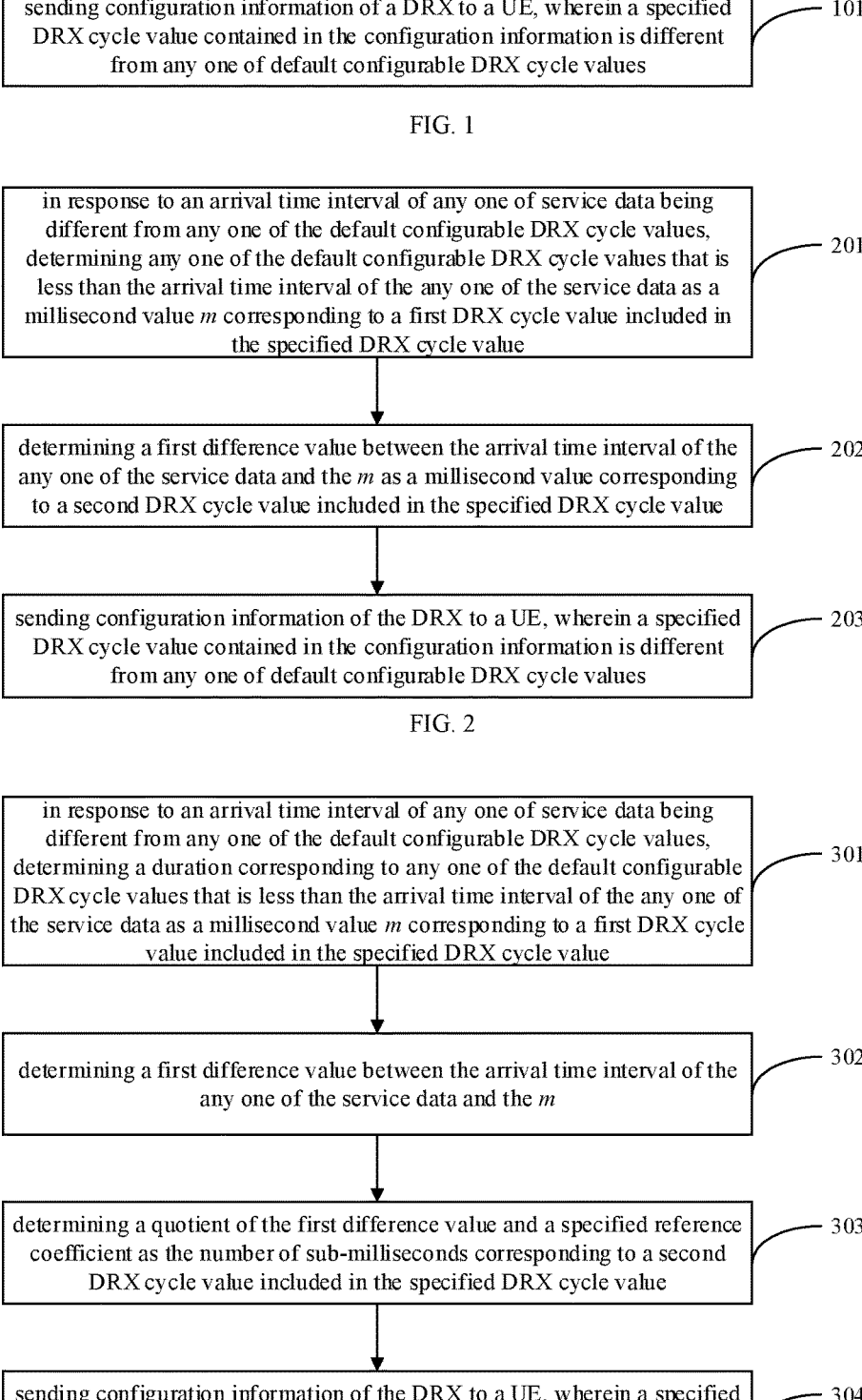

sending configuration information of a DRX to a UE, wherein a specified DRX cycle value contained in the configuration information is different from any one of default configurable DRX cycle values ⟋— 101

FIG. 1 in response to an arrival time interval of any one of service data being different from any one of the default configurable DRX cycle values, determining any one of the default configurable DRX cycle values that is less than the arrival time interval of the any one of the service data as a millisecond value $m$ corresponding to a first DRX cycle value included in the specified DRX cycle value ⟋— 201 determining a first difference value between the arrival time interval of the any one of the service data and the $m$ as a millisecond value corresponding to a second DRX cycle value included in the specified DRX cycle value ⟋— 202 sending configuration information of the DRX to a UE, wherein a specified DRX cycle value contained in the configuration information is different from any one of default configurable DRX cycle values ⟋— 203

FIG. 2 in response to an arrival time interval of any one of service data being different from any one of the default configurable DRX cycle values, determining a duration corresponding to any one of the default configurable DRX cycle values that is less than the arrival time interval of the any one of the service data as a millisecond value $m$ corresponding to a first DRX cycle value included in the specified DRX cycle value ⟋— 301 determining a first difference value between the arrival time interval of the any one of the service data and the $m$ ⟋— 302 determining a quotient of the first difference value and a specified reference coefficient as the number of sub-milliseconds corresponding to a second DRX cycle value included in the specified DRX cycle value ⟋— 303 sending configuration information of the DRX to a UE, wherein a specified DRX cycle value contained in the configuration information is different from any one of default configurable DRX cycle values ⟋— 304

FIG. 3

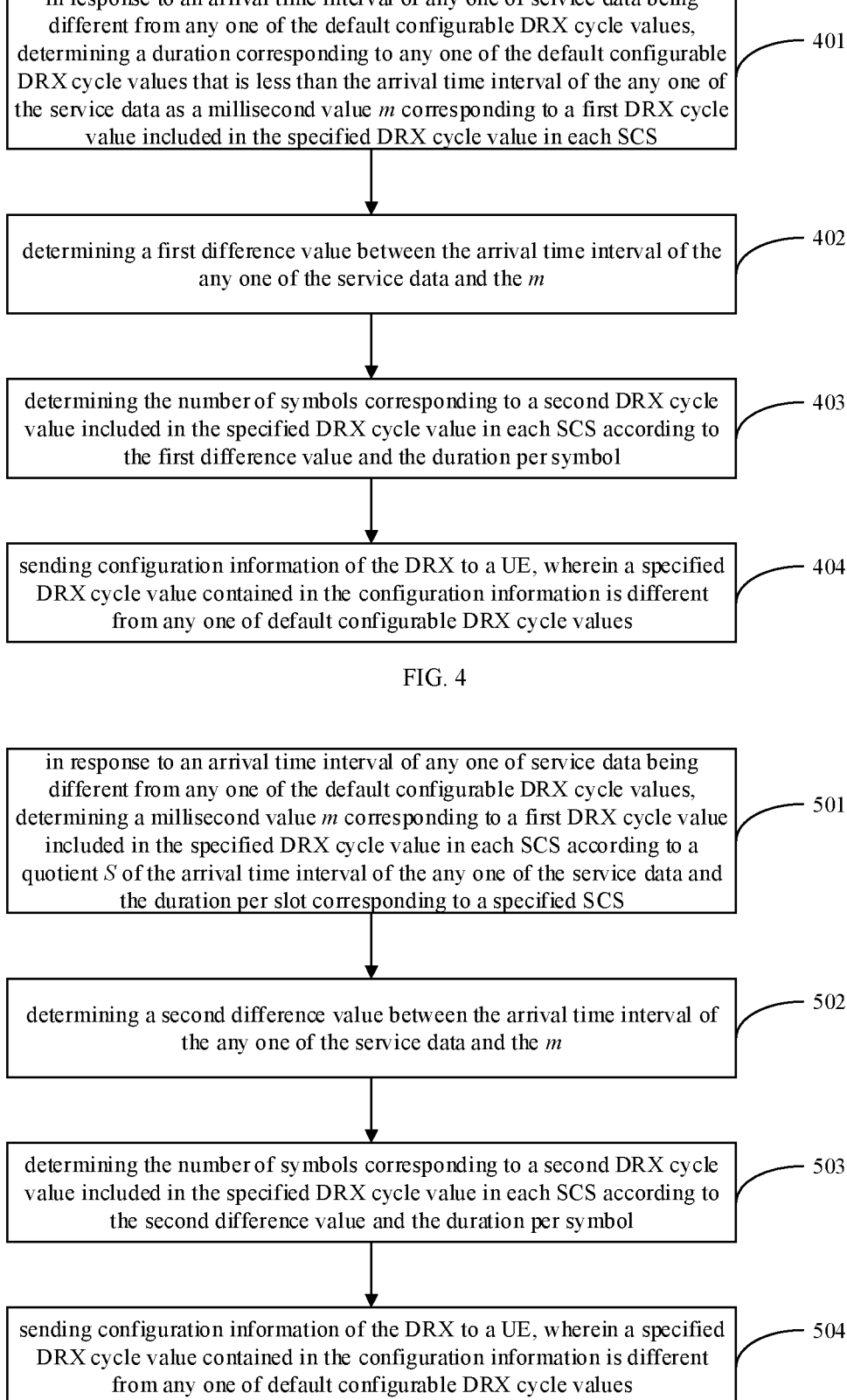

in response to an arrival time interval of any one of service data being
different from any one of the default configurable DRX cycle values,
determining a duration corresponding to any one of the default configurable
DRX cycle values that is less than the arrival time interval of the any one of
the service data as a millisecond value *m* corresponding to a first DRX cycle
value included in the specified DRX cycle value in each SCS — 401 determining a first difference value between the arrival time interval of the
any one of the service data and the *m* — 402 determining the number of symbols corresponding to a second DRX cycle
value included in the specified DRX cycle value in each SCS according to
the first difference value and the duration per symbol — 403 sending configuration information of the DRX to a UE, wherein a specified
DRX cycle value contained in the configuration information is different
from any one of default configurable DRX cycle values — 404

FIG. 4 in response to an arrival time interval of any one of service data being
different from any one of the default configurable DRX cycle values,
determining a millisecond value *m* corresponding to a first DRX cycle value
included in the specified DRX cycle value in each SCS according to a
quotient *S* of the arrival time interval of the any one of the service data and
the duration per slot corresponding to a specified SCS — 501 determining a second difference value between the arrival time interval of
the any one of the service data and the *m* — 502 determining the number of symbols corresponding to a second DRX cycle
value included in the specified DRX cycle value in each SCS according to
the second difference value and the duration per symbol — 503 sending configuration information of the DRX to a UE, wherein a specified
DRX cycle value contained in the configuration information is different
from any one of default configurable DRX cycle values — 504

FIG. 5

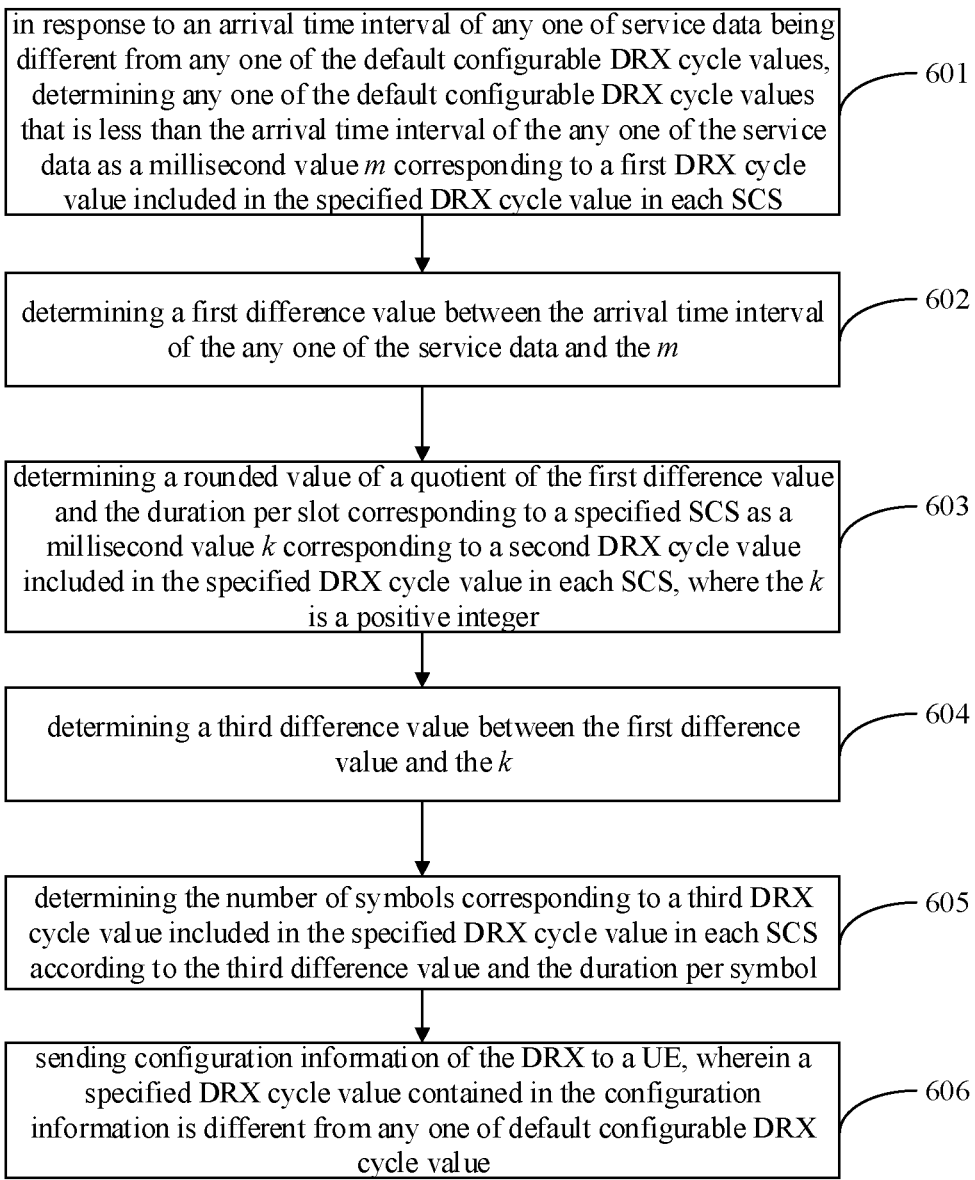

in response to an arrival time interval of any one of service data being different from any one of the default configurable DRX cycle values, determining any one of the default configurable DRX cycle values that is less than the arrival time interval of the any one of the service data as a millisecond value $m$ corresponding to a first DRX cycle value included in the specified DRX cycle value in each SCS — 601 determining a first difference value between the arrival time interval of the any one of the service data and the $m$ — 602 determining a rounded value of a quotient of the first difference value and the duration per slot corresponding to a specified SCS as a millisecond value $k$ corresponding to a second DRX cycle value included in the specified DRX cycle value in each SCS, where the $k$ is a positive integer — 603 determining a third difference value between the first difference value and the $k$ — 604 determining the number of symbols corresponding to a third DRX cycle value included in the specified DRX cycle value in each SCS according to the third difference value and the duration per symbol — 605 sending configuration information of the DRX to a UE, wherein a specified DRX cycle value contained in the configuration information is different from any one of default configurable DRX cycle value — 606

FIG. 6

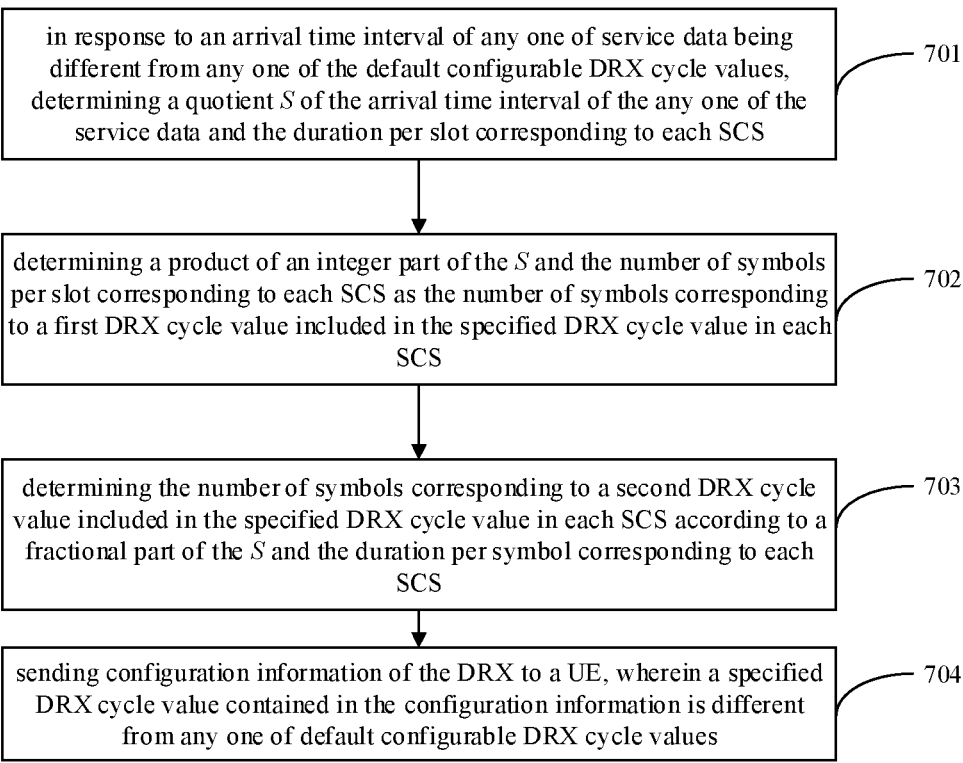

in response to an arrival time interval of any one of service data being different from any one of the default configurable DRX cycle values, determining a quotient $S$ of the arrival time interval of the any one of the service data and the duration per slot corresponding to each SCS ⟋ 701 determining a product of an integer part of the $S$ and the number of symbols per slot corresponding to each SCS as the number of symbols corresponding to a first DRX cycle value included in the specified DRX cycle value in each SCS ⟋ 702 determining the number of symbols corresponding to a second DRX cycle value included in the specified DRX cycle value in each SCS according to a fractional part of the $S$ and the duration per symbol corresponding to each SCS ⟋ 703 sending configuration information of the DRX to a UE, wherein a specified DRX cycle value contained in the configuration information is different from any one of default configurable DRX cycle values ⟋ 704

FIG. 7

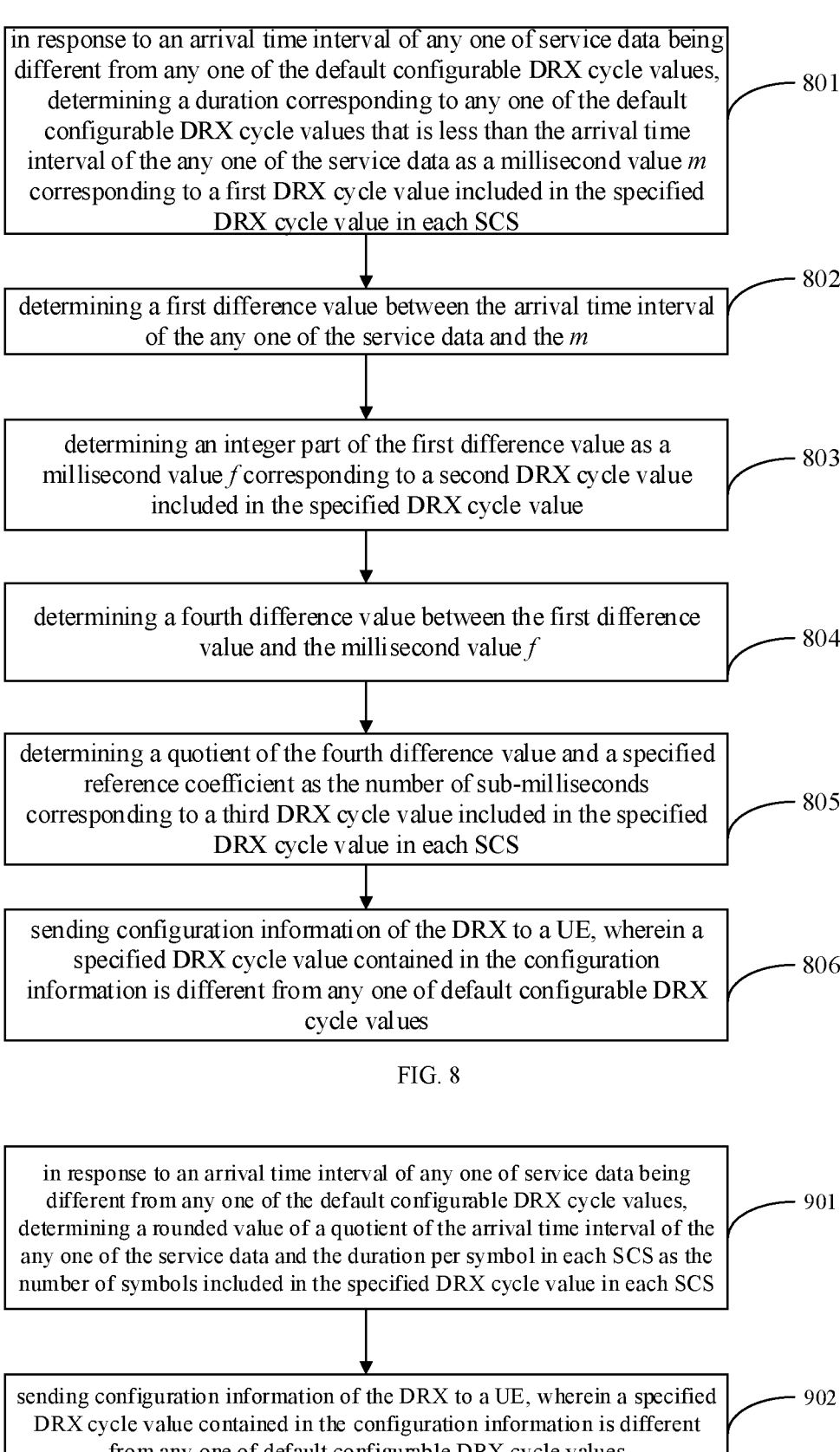

in response to an arrival time interval of any one of service data being different from any one of the default configurable DRX cycle values, determining a duration corresponding to any one of the default configurable DRX cycle values that is less than the arrival time interval of the any one of the service data as a millisecond value *m* corresponding to a first DRX cycle value included in the specified DRX cycle value in each SCS — 801 determining a first difference value between the arrival time interval of the any one of the service data and the *m* — 802 determining an integer part of the first difference value as a millisecond value *f* corresponding to a second DRX cycle value included in the specified DRX cycle value — 803 determining a fourth difference value between the first difference value and the millisecond value *f* — 804 determining a quotient of the fourth difference value and a specified reference coefficient as the number of sub-milliseconds corresponding to a third DRX cycle value included in the specified DRX cycle value in each SCS — 805 sending configuration information of the DRX to a UE, wherein a specified DRX cycle value contained in the configuration information is different from any one of default configurable DRX cycle values — 806

FIG. 8 in response to an arrival time interval of any one of service data being different from any one of the default configurable DRX cycle values, determining a rounded value of a quotient of the arrival time interval of the any one of the service data and the duration per symbol in each SCS as the number of symbols included in the specified DRX cycle value in each SCS — 901 sending configuration information of the DRX to a UE, wherein a specified DRX cycle value contained in the configuration information is different from any one of default configurable DRX cycle values — 902

FIG. 9

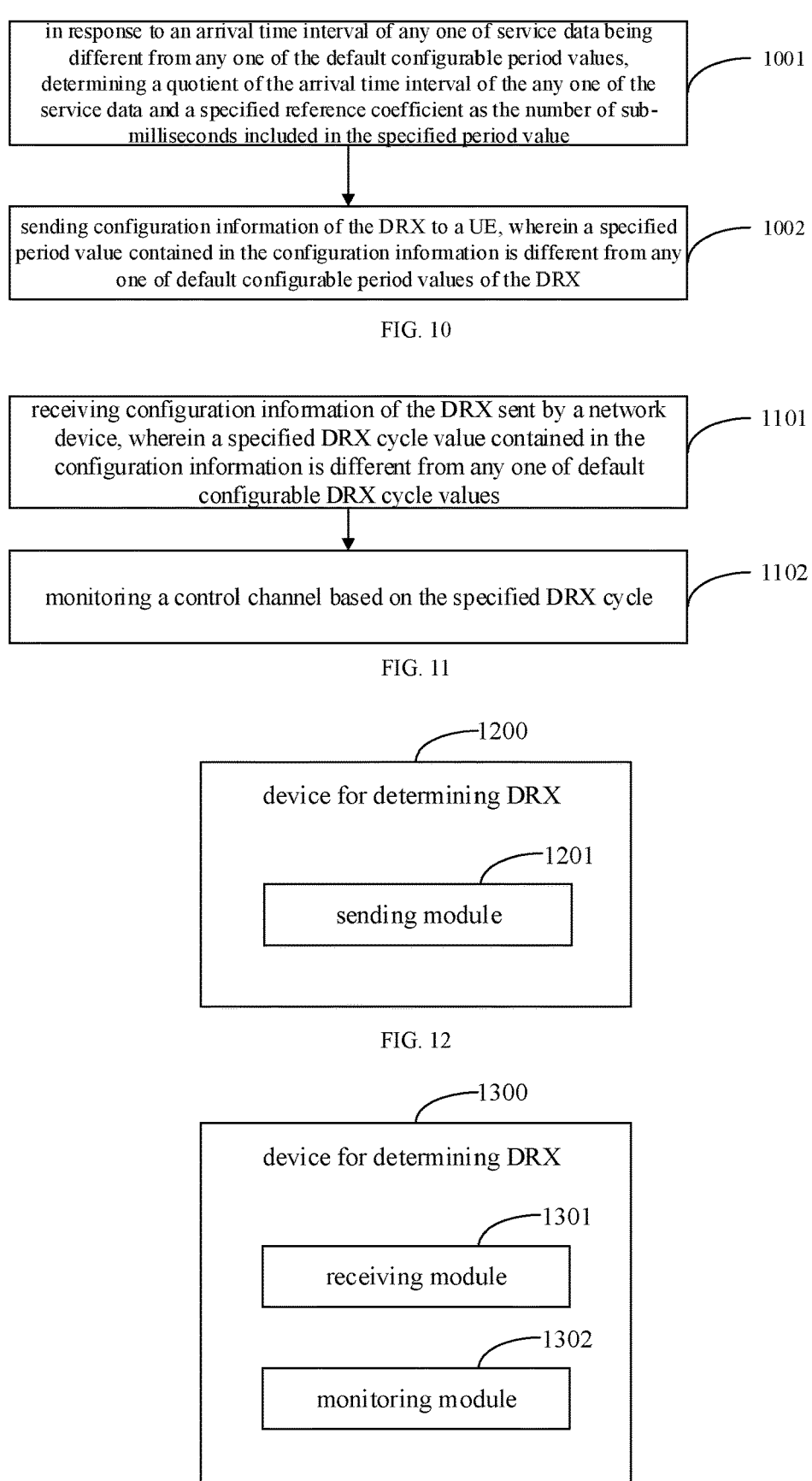

in response to an arrival time interval of any one of service data being different from any one of the default configurable period values, determining a quotient of the arrival time interval of the any one of the service data and a specified reference coefficient as the number of sub-milliseconds included in the specified period value — 1001 sending configuration information of the DRX to a UE, wherein a specified period value contained in the configuration information is different from any one of default configurable period values of the DRX — 1002

FIG. 10 receiving configuration information of the DRX sent by a network device, wherein a specified DRX cycle value contained in the configuration information is different from any one of default configurable DRX cycle values — 1101 monitoring a control channel based on the specified DRX cycle — 1102

FIG. 11

—1200 device for determining DRX

—1201 sending module

FIG. 12

—1300 device for determining DRX

—1301 receiving module

—1302 monitoring module

FIG. 13

DISCONTINUOUS RECEPTION DETERMINING METHOD AND DEVICE, COMMUNICATION DEVICE, AND STORAGE MEDIUM

CROSS-REFERENCE TO RELATED APPLICATIONS

This application is a U.S. national stage application of International Application No. PCT/CN2021/077301, filed Feb. 22, 2021, the entire contents of which are incorporated herein by reference.

TECHNICAL FIELD

The present disclosure relates to the technical field of wireless communication, and more particularly to a method and device for determining a discontinuous reception, a communication device and a storage medium.

BACKGROUND

A typical video streaming service generates video frames periodically, and a typical video frame rate is 30 frames or 60 frames per second, that is, the video frame interval is 33.33 or 16.66 milliseconds (ms). An augmented reality (AR) or a virtual reality (VR) service may provide a user with a video streaming service, and has a higher delay requirement (such as, 5 to 10 ms) than a traditional video streaming service.

In the related art, in a 5G system, in order to reduce power consumption of a user equipment (UE), a network side introduces a discontinuous reception (DRX) mechanism for uplink and downlink video services. For the DRX, a DRX cycle that may be configured by the network side includes: 10 ms, 20 ms, 32 ms, 40 ms, 60 ms, 64 ms, 70 ms, 80 ms, 128 ms, 160 ms, 256 ms, and 320 ms. However, the currently configured DRX cycle cannot match the frame interval (i.e., 33.33 ms or 16.66 ms) of the video service, so that an additional data transmission delay will be generated when the configured DRX cycle cannot match an arrival time interval of the service.

SUMMARY

According to a first aspect of embodiments of the present disclosure, there is provided a method for determining a DRX, which is applied to a network device and includes: sending configuration information of the DRX to a UE. A specified DRX cycle value contained in the configuration information is different from any one of default configurable DRX cycle values.

According to a second aspect of embodiments of the present disclosure, there is provided a method for determining a DRX, which is applied to a UE and includes: receiving configuration information of the DRX sent by a network device, a specified DRX cycle value contained in the configuration information being different from any one of default configurable DRX cycle values; and monitoring a control channel based on the specified DRX cycle.

According to a third aspect of embodiments of the present disclosure, there is provided a communication device, which includes: a transceiver; a memory; and a processor. The processor is connected to the transceiver and the memory respectively, and configured to control a transmission and a reception of a wireless signal of the transceiver and cause the method for determining the DRX as mentioned above to be implemented by executing computer-executable instructions on the memory.

According to a fourth aspect of embodiments of the present disclosure, there is provided a computer storage medium, which has stored therein computer-executable instructions that, when executed by a processor, cause the method for determining the DRX as mentioned above to be implemented.

Additional aspects and advantages of present disclosure will be given in part in the following descriptions, become apparent in part from the following descriptions, or be learned from the practice of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which:

FIG. 1 is a schematic flowchart of a method for determining a DRX applied to a network device provided by embodiments of the present disclosure;

FIG. 2 is a schematic flowchart of a method for determining a DRX provided by embodiments of the present disclosure;

FIG. 3 is a schematic flowchart of a method for determining a DRX provided by embodiments of the present disclosure;

FIG. 4 is a schematic flowchart of a method for determining a DRX provided by embodiments of the present disclosure;

FIG. 5 is a schematic flowchart of a method for determining a DRX provided by embodiments of the present disclosure;

FIG. 6 is a schematic flowchart of a method for determining a DRX provided by embodiments of the present disclosure;

FIG. 7 is a schematic flowchart of a method for determining a DRX provided by embodiments of the present disclosure;

FIG. 8 is a schematic flowchart of a method for determining a DRX provided by embodiments of the present disclosure;

FIG. 9 is a schematic flowchart of a method for determining a DRX provided by embodiments of the present disclosure;

FIG. 10 is a schematic flowchart of a method for determining a DRX provided by embodiments of the present disclosure;

FIG. 11 is a schematic flowchart of a method for determining a DRX applied to a user equipment (UE) provided by embodiments of the present disclosure;

FIG. 12 is a schematic diagram of a device for determining a DRX applied to a network device provided by embodiments of the present disclosure;

FIG. 13 is a schematic diagram of another device for determining a DRX applied to a user equipment (UE) provided by embodiments of the present disclosure;

DETAILED DESCRIPTION

Figure 14:
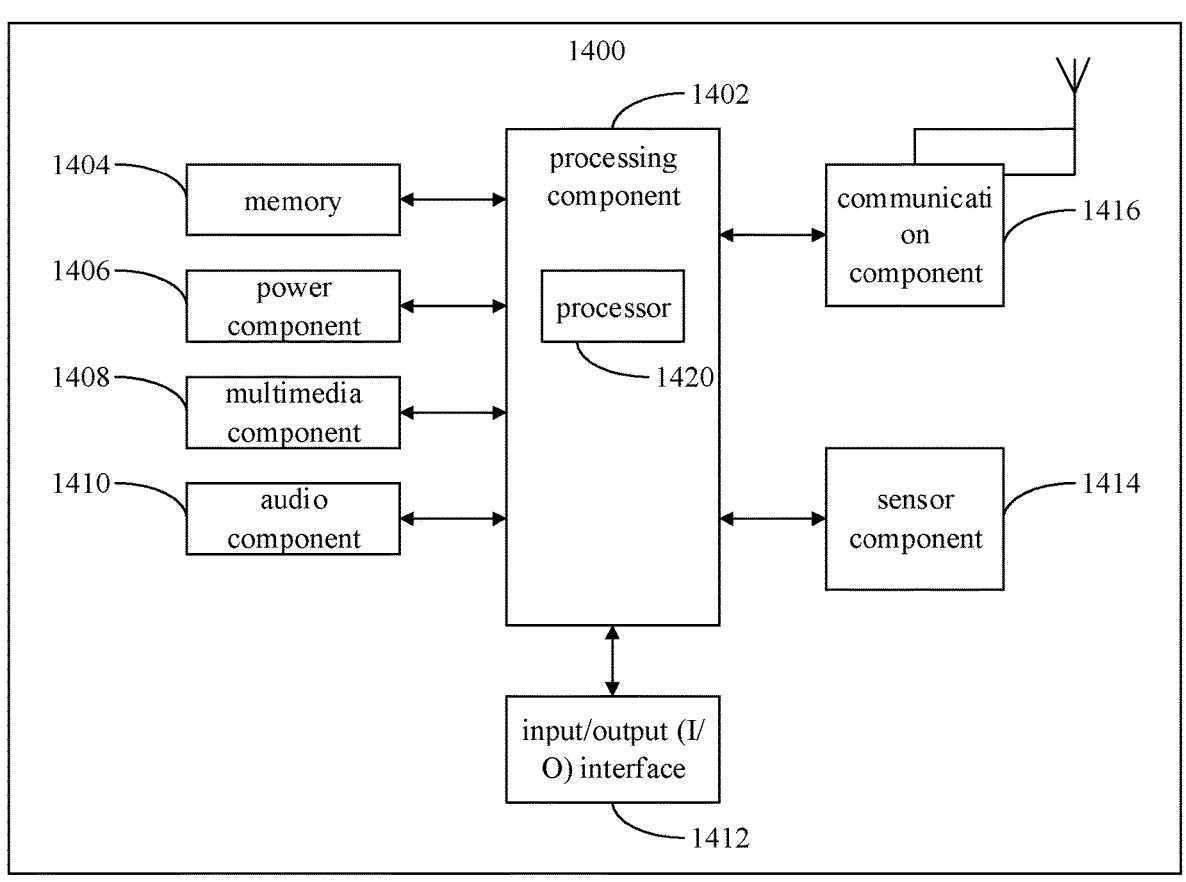
FIG. 14 is a block diagram of a user equipment provided by embodiments of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of devices and methods consistent with some aspects of embodiments of the present disclosure as recited in the appended claims.

Terms used in embodiments of the present disclosure are only for the purpose of describing specific embodiments, but should not be construed to limit the present disclosure. As used in embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Embodiments of the present disclosure will be described in detail bellow, examples of which are illustrated in the accompanying drawings. Throughout the descriptions, the same or similar elements are denoted by the same or like reference numerals. Embodiments described below with reference to drawings are explanatory, serve to explain the present disclosure, and cannot be construed to limit embodiments of the present disclosure.

Aiming at the problem in the related art that an additional data transmission delay will be generated when a configured DRX cycle cannot match an arrival time interval of a service, embodiments of the present disclosure provide a method for determining a DRX.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

A method and device for determining a DRX, a communication device, and a storage medium provided by the present disclosure will be described in detail below with reference to the accompanying drawings.

FIG. 1 is a schematic flowchart of a method for determining a DRX provided by embodiments of the present disclosure, which is applied to a network device, such as a base station.

As shown in FIG. 1, the method for determining the DRX includes following steps.

In step 101, configuration information of the DRX is sent to a UE. A specified DRX cycle value contained in the configuration information is different from any one of default configurable DRX cycle values.

Optionally, the specified DRX cycle value may be determined by the network device according to a protocol, or may be determined according to requirements of a current service.

In addition, the above-described configuration information may be a radio resource control (RRC) message or a physical downlink control channel (PDCCH) control signaling, which is not limited in the present disclosure.

The specified DRX cycle value may be a value of any one of following types of DRX cycles: a DRX long cycle, a DRX short cycle, a scheduling period, a retransmission period, a hybrid automatic repeat request (HARD) period and an inactivity period.

It can be understood that for different types of DRX cycles, the default configurable DRX cycle values are different. For example, for the DRX long cycle, the default configurable DRX cycle values may include: 10 ms, 20 ms, 32 ms, 40 ms, 60 ms, 64 ms, 70 ms, 80 ms, 128 ms, 160 ms, 256 ms, 320 ms. For the DRX short cycle, the default configurable DRX cycle values may include: 2 ms, 3 ms, 4 ms, 5 ms, 6 ms, 7 ms, 8 ms, 10 ms, 14 ms, 16 ms, 20 ms, 30 ms, 32 ms, 35 ms, 40 ms, 64 ms, 80 ms, 128 ms, 160 ms, 256 ms, 320 ms, 512 ms, 640 ms.

Optionally, in the present disclosure, when determining that an arrival time interval of any one of service data is different from each of the default configurable DRX cycle values, the network device may determine the specified DRX cycle value according to the arrival time interval of the any one of the service data.

For example, AR or VR services can provide users with video streaming services. The typical video frame rate is 30 frames or 60 frames per second, that is, an arrival time interval of video frames is 33.33 ms or 16.66 ms, which however is different from the default configurable DRX cycle values (such as 10 ms, 20 ms, etc.). Therefore, the network device in the present disclosure is able to determine a current specified DRX cycle value according to the arrival time interval of the video service, and send the specified DRX cycle value to the UE, so as to perform uplink and downlink data transmissions with the UE based on the specified DRX cycle value.

Optionally, the specified DRX cycle value may include different content as required. For example, the specified DRX cycle value may include a first DRX cycle value, and the first DRX cycle value may be a millisecond value, the number of sub-milliseconds, or the number of orthogonal frequency division multiplexing (OFDM) symbols.

The term "sub-millisecond" is a new time measuring unit proposed in the present disclosure to more accurately represent the specified DRX cycle value, so that the specified DRX cycle value is as close as possible to the arrival time interval of the service data. It should be noted that a sub-millisecond may be a time measuring unit smaller than a millisecond, and a specific duration corresponding to a sub-millisecond may be determined as required, which is not limited in embodiments of the present disclosure.

Optionally, the specified DRX cycle value may also include a combination of a first DRX cycle value and a second DRX cycle value. The first DRX cycle value may be a millisecond value or the number of symbols, and the second DRX cycle value may also be a millisecond value, the number of symbols, or the number of sub-milliseconds, etc., which are not limited in the present disclosure.

Optionally, the specified DRX cycle value may also include a combination of a first DRX cycle value, a second DRX cycle value, and a third DRX cycle value. The first DRX cycle value may be a millisecond value, the second DRX cycle value may also be a millisecond value, and the third DRX cycle value may be the number of symbols or the number of sub-milliseconds, etc., which are not limited in the present disclosure.

In order to support wider application scenarios, several types of subcarrier spacing (SCS) may be configured in a wireless communication system. As shown in Table 1 below, different SCSs and cyclic prefixes (CP) correspond to different resource allocation information:

TABLE 1

| SCS (kHz) | Number of symbols per slot | Duration per symbol (ms) | Number of slots per frame | Duration per slot (ms) | Number of slots per sub-frame |
|---|---|---|---|---|---|
| 15 | 14 | 0.0714 | 10 | 1 | 1 |
| 30 | 14 | 0.0357 | 20 | 0.5 | 2 |
| 60 (normal CP) | 14 | 0.0179 | 40 | 0.25 | 4 |
| 60 (extended CP) | 12 | 0.0208 | 40 | 0.25 | 4 |
| 120 | 14 | 0.0089 | 80 | 0.125 | 8 |
| 240 | 14 | 0.0045 | 160 | 0.0625 | 16 |

It can be understood that each element or each correspondence in Table 1 exist independently. Even though these elements and correspondences are listed in the same table, it does not mean that all the elements and correspondences in Table 1 must exist at the same time as shown in Table 1, and the value of each element and each correspondence do not depend on the value of any other element or any other correspondence in Table 1. Therefore, those skilled in the art can understand that the value of each element and each correspondence in Table 1 correspond to an independent embodiment.

As a possible implementation, when determining the specified DRX cycle value, the network device can determine the specified DRX cycle value in each SCS, i.e., determine the number of symbols, a millisecond value, and/or the number of sub-milliseconds included in the specified DRX cycle value in each SCS, according to the resource allocation information corresponding to different SCSs.

As another possible implementation, when determining the specified DRX cycle value, the network device may also determine the specified DRX cycle value in each SCS based on the specified DRX cycle value in a specified SCS. Specifically, the network device may determine the specified DRX cycle value in the specified SCS according to the resource allocation information corresponding to the specified SCS, and determine the specified DRX cycle value in any other SCS according to a relationship between the resource allocation information corresponding to the specified SCS and the resource allocation information corresponding to the any other SCS, and the specified DRX cycle value in the specified SCS.

With the method for determining the DRX according to embodiments of the present disclosure, by setting a specified DRX cycle value for the DRX, data transmission is performed with the UE based on the DRX cycle value that matches the arrival time interval of data of the service to be performed as much as possible, thereby minimizing service data transmission delay and improving the quality and performance of the service.

Below, a method for determining a DRX provided by embodiments of the present disclosure will be further described with reference to FIG. 2.

FIG. 2 is a schematic flowchart of a method for determining a DRX provided by embodiments of the present disclosure, which is applied to a network device, such as a base station.

As shown in FIG. 2, the method for determining the DRX includes the following steps.

In step 201, in response to an arrival time interval of any one of service data being different from any one of the default configurable DRX cycle values, any one of the default configurable DRX cycle values that is less than the arrival time interval of the any one of the service data is determined as a millisecond value m corresponding to a first DRX cycle value included in the specified DRX cycle value, where the m is a positive integer.

As a possible implementation, when the specified DRX cycle value is a combination of a first DRX cycle value and a second DRX cycle value, the first DRX cycle value and the second DRX cycle value each may be a millisecond value.

Optionally, when determining the first DRX cycle value, if there are a plurality of default configurable DRX cycle values that are all less than the arrival time interval of any one of the service data, any default configurable DRX cycle value selected from the a plurality of default configurable DRX cycle values may be used as the first DRX cycle value; alternatively, a default configurable DRX cycle value with a smallest difference from the arrival time interval of any one of the service data may be selected as the first DRX cycle value.

For example, the arrival time interval of any one of the service data is 16.66 ms, for the DRX long cycle, when determining the specified DRX cycle value in each SCS, since the default configurable DRX cycle value less than 16.66 ms is 10 ms, the first DRX cycle value may be determined as 10 ms.

For another example, the arrival time interval of any one of the service data is 33.33 ms, for the DRX long cycle, when determining the specified DRX cycle value in each SCS, since the default configurable DRX cycle values less than 33.33 ms are 10 ms, 20 ms and 32 ms, the first DRX cycle value may be determined to be 10 ms, 20 ms or 32 ms. Alternatively, since the difference between 32 ms and 33.33 ms is the smallest, the first DRX cycle value may be determined as 32 ms.

In step 202, a first difference value between the arrival time interval of the any one of the service data and the m is determined as a millisecond value corresponding to a second DRX cycle value included in the specified DRX cycle value.

Optionally, when the specified DRX cycle value is a combination of the first DRX cycle value and the second DRX cycle value, and the first DRX cycle value and the second DRX cycle value each may be a millisecond value, the first difference value between the arrival time interval of the any one of the service data and the m may be determined as the millisecond value corresponding to the second DRX cycle value.

For example, the arrival time interval of the service data is 16.66 ms, for the DRX long cycle, the first DRX cycle value included in the specified DRX cycle value is 10 ms, and the first difference value is 6.66 ms. In this case, the second DRX cycle value included in the specified DRX cycle value in each SCS may be determined as 6.66 ms.

For another example, the arrival time interval of the service data is 33.33 ms, for the DRX long cycle, the first DRX cycle value included in the specified DRX cycle value is 32 ms, and the first difference value is 1.33 ms. In this case, the second DRX cycle value included in the specified DRX cycle value in each SCS may be determined as 1.33 ms.

In step 203, configuration information of the DRX is sent to a user equipment. A specified DRX cycle value contained in the configuration information is different from any one of default configurable DRX cycle values.

In embodiments of the present disclosure, the step 203 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 3.

FIG. 3 is a schematic flowchart of a method for determining a DRX provided by embodiments of the present disclosure, which is applied to a network device.

As shown in FIG. 3, the method for determining the DRX includes the following steps.

In step 301, in response to an arrival time interval of any one of service data being different from any one of the default configurable DRX cycle values, a duration corresponding to any one of the default configurable DRX cycle values that is less than the arrival time interval of the any one of the service data is determined as a millisecond value m corresponding to a first DRX cycle value included in the specified DRX cycle value.

In step 302, a first difference value between the arrival time interval of the any one of the service data and the m is determined.

In embodiments of the present disclosure, the steps 301-302 may be implemented in any manner as described in various embodiments of the present disclosure, which are not limited in embodiments of the present disclosure, and will not be elaborated here.

In step 303, a quotient of the first difference value and a specified reference coefficient is determined as the number of sub-milliseconds corresponding to a second DRX cycle value included in the specified DRX cycle value.

The specified reference coefficient may be 1/a. It should be noted that, the specific value of a may be determined as required, which is not limited in embodiments of the present disclosure. For example, a may be 32, so the specified reference coefficient is 1/32.

As a possible implementation, when the specified DRX cycle value is a combination of the first DRX cycle value and the second DRX cycle value, the first DRX cycle value may be a millisecond value, and the second DRX cycle value may be the number of sub-milliseconds. Therefore, the quotient of the first difference value between the arrival time interval of the any one of the service data and the m and the specified reference coefficient may be determined as the number of sub-milliseconds corresponding to the second DRX cycle value.

For example, the arrival time interval of the service data is 16.66 ms, and the specified reference coefficient is 1/32. For the DRX long cycle, the first DRX cycle value included in the specified DRX cycle value in each SCS is 10 ms, and the first difference value is 6.66 ms. In this case, the number of sub-milliseconds corresponding to the second DRX cycle value included in the specified DRX cycle value in each SCS may be determined to be 6.66/(1/32)=213.

For another example, the arrival time interval of the service data is 33.33 ms, and the specified reference coefficient is 1/32. For the DRX long cycle, the first DRX cycle value included in the specified DRX cycle value in each SCS is 32 ms, and the first difference value is 1.33 ms. In this case, the number of sub-milliseconds corresponding to the second DRX cycle value included in the specified DRX cycle value in each SCS may be determined to be 1.33/(1/32) =43.

Optionally, when the quotient of the first difference value and the specified reference coefficient is not an integer, a rounded value of the quotient of the first difference value and the specified reference coefficient may be determined as the number of sub-milliseconds corresponding to the second DRX cycle value included in the specified DRX cycle value. In embodiments of the present disclosure, the rounding may be rounding down, rounding up, or rounding off, and so on.

In step 304, configuration information of the DRX is sent to a user equipment. A specified DRX cycle value contained in the configuration information is different from any one of default configurable DRX cycle values.

In embodiments of the present disclosure, the step 304 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 4.

FIG. 4 is a schematic flowchart of a method for determining a DRX provided by embodiments of the present disclosure, which is applied to a network device.

As shown in FIG. 4, the method for determining the DRX includes the following steps.

In step 401, in response to an arrival time interval of any one of service data being different from any one of the default configurable DRX cycle values, a duration corresponding to any one of the default configurable DRX cycle values that is less than the arrival time interval of the any one of the service data is determined as a millisecond value m corresponding to a first DRX cycle value included in the specified DRX cycle value in each SCS, where m is a positive integer.

Time domain resource allocation information of each SCS may include: a duration per slot and a duration per symbol.

As a possible implementation, when the specified DRX cycle value is a combination of the first DRX cycle value and the second DRX cycle value, the first DRX cycle value may be a millisecond value, and the second DRX cycle value may be the number of symbols.

Optionally, when determining the first DRX cycle value, if there are a plurality of default configurable resource DRX cycles that are all less than the arrival time interval of any one of the service data, any of the a plurality of default configurable resource DRX cycles may be selected; alternatively, a default configurable resource DRX cycle with a smallest difference from the arrival time interval of any one of the service data may be selected from the a plurality of default configurable resource DRX cycles.

For example, the arrival time interval of any one of the service data is 16.66 ms, for a SCS of 15 kHZ, when determining the specified DRX cycle value corresponding to the SCS, since the default configurable DRX cycle value less than 16.66 ms is 10 ms, the first DRX cycle value may be determined as 10 ms.

For another example, the arrival time interval of any one of the service data is 33.33 ms, for a SCS of 15 kHZ, when determining the specified DRX cycle value corresponding to the SCS, since the default configurable DRX cycle values less than 33.33 ms are 10 ms, 20 ms and 32 ms, the first DRX cycle value may be determined to be 10 ms, 20 ms or 32 ms. Alternatively, since the difference between 32 ms and 33.33 ms is the smallest, the first DRX cycle value may be determined as 32 ms.

In step 402, a first difference value between the arrival time interval of the any one of the service data and the m is determined.

In step 403, the number of symbols corresponding to a second DRX cycle value included in the specified DRX cycle value in each SCS is determined according to the first difference value and the duration per symbol.

Optionally, a rounded value of a quotient of the first difference value and the duration per symbol in each SCS may be determined as the number of symbols corresponding to the second DRX cycle value included in the specified DRX cycle value in each SCS.

In embodiments of the present disclosure, the rounding may be rounding down, rounding up, or rounding off, and so on.

For example, the arrival time interval of the service data is 16.66 ms, and the first DRX cycle value included in the specified DRX cycle value is 10 ms for a SCS of 15 kHZ. In this case, the first difference value is 6.66 ms, and a quotient of the first difference value and a duration per symbol (0.0714 ms) corresponding to the SCS of 15 kHZ is 93.277, which is rounded off to a value of 93. Therefore, the number of symbols corresponding to the second DRX cycle value included in the specified DRX cycle value corresponding to the SCS of 15 kHZ is 93.

For another example, the arrival time interval of the service data is 16.66 ms, and the first DRX cycle value included in a specified resource is 10 ms for a SCS of 30 kHZ. In this case, the first difference value is 6.66 ms, and a quotient of the first difference value and a duration per symbol (0.0357 ms) corresponding to the SCS of 30 kHZ is 186.555, which is rounded off to a value of 187. Therefore, the number of symbols corresponding to the second DRX cycle value included in the specified DRX cycle value corresponding to the SCS of 30 kHZ is 187.

For a service with the data arrival time interval of 16.66 ms (the first DRX cycle value is 10 ms) or 33.33 ms (the first DRX cycle value is 32 ms), a rounded value of a quotient of the first difference value and the duration per symbol in each SCS may be determined as a value configurable for the second DRX cycle value included in the specified DRX cycle value in each SCS, as shown in Table 2 below:

TABLE 2

| SCS (kHz) | second DRX cycle value (corresponding to a service with an arrival time interval of 16.66 ms) | second DRX cycle value (corresponding to a service with an arrival time interval of 33.33 ms) |
|---|---|---|
| 15 | 93 | 19 |
| 30 | 187 | 37 |
| 60 (normal CP) | 372 | 74 |
| 60 (extended CP) | 320 | 64 |
| 120 | 748 | 150 |
| 240 | 1480 | 296 |

It can be understood that each element or each correspondence in Table 2 exist independently. Even though these elements and correspondences are listed in the same table, it does not mean that all the elements and correspondences in Table 2 must exist at the same time as shown in Table 2, and the value of each element and each correspondence do not depend on the value of any other element or any other correspondence in Table 2. Therefore, those skilled in the art can understand that the value of each element and each correspondence in Table 2 correspond to an independent embodiment.

It should be noted that, the quotient of the first difference value and the duration per symbol in each SCS may be rounded up or rounded down, and the rounded value may be determined as the above individual value of the second DRX cycle value included in the specified DRX cycle value.

Optionally, as can be seen from Table 1, there exists a certain multiple relationship among various SCSs in term of the duration per symbol and the duration per slot. In the present disclosure, it is also possible to determine any SCS as a specified SCS, so that after the specified DRX cycle value in the specified SCS is determined, the specified DRX cycle value in each SCS may be determined based on the specified DRX cycle value in the specified SCS.

That is, in the present disclosure, a product of a rounded value of a quotient of the first difference value and the duration per symbol in the specified SCS multiplied by a ratio of the number of slots per frame in each SCS to the number of slots per frame in the specified SCS may be determined as the number of symbols corresponding to the second DRX cycle value included in the specified DRX cycle value in each SCS.

For example, for a service with an arrival time interval of 16.66 ms, as can be seen from the above analysis, for a SCS of 15 kHZ (the number of slots per frame is 10), the number of symbols corresponding to the second DRX cycle value is 93. If the SCS of 15 kHZ is the specified SCS, the number of symbols corresponding to the second DRX cycle value included in the designated DRX cycle value in a SCS of 30 kHZ (the number of slots per frame is 20) is: 93×(20/10) =186.

In addition, for the extended CP, as compared with the normal CP, when the duration per slot is the same, the number of symbols per slot is different. Therefore, the specified DRX cycle value in the extended CP may be calculated using any method of calculating the specified DRX cycle value as described in the present disclosure.

For example, if the SCS of 15 kHZ is the specified SCS, in the case where it is determined for the service with the arrival time interval of 16.66 ms that the first DRX cycle value in the specified DRX cycle value in the SCS of 15 kHZ is 10 ms, and the second DRX cycle value is 93 symbols, it may be determined that the first DRX cycle value in the specified DRX cycle value in the SCS of 30 kHZ is 10 ms, and the second DRX cycle value is 93×2=186, where 2 is the ratio of the number of slots per frame in the SCS of 30 kHZ to the number of slots per frame in the SCS of 15 kHZ. Similarly, the specified DRX cycle value in each SCS can be determined.

For a service with the data arrival time interval of 16.66 ms (the first DRX cycle value is 10 ms, and the second DRX cycle value is 6 ms) or 33.33 ms (the first DRX cycle value is 32 ms, and the second DRX cycle value is 1 ms), in the case where the SCS of 15 kHZ is the specified SCS, the value configurable for the second DRX cycle value in the specified DRX cycle value in each SCS may be determined according to the relationship among different SCSs in term of the number of slots per frame, as shown in Table 3 below.

TABLE 3

| SCS (kHz) | second DRX cycle value (corresponding to a service with an arrival time interval of 16.66 ms) | second DRX cycle value (corresponding to a service with an arrival time interval of 33.33 ms) |
|---|---|---|
| 15 | 93 | 19 |
| 30 | 186 | 38 |
| 60 (normal CP) | 372 | 76 |
| 60 (extended CP) | 320 | 64 |
| 120 | 744 | 152 |
| 240 | 1488 | 304 |

It can be understood that each element or each correspondence in Table 3 exist independently. Even though these elements and correspondences are listed in the same table, it does not mean that all the elements and correspondences in Table 3 must exist at the same time as shown in Table 3, and the value of each element and each correspondence do not depend on the value of any other element or any other correspondence in Table 3. Therefore, those skilled in the art can understand that the value of each element and each correspondence in Table 3 correspond to an independent embodiment.

Optionally, a maximum integer multiple of a first specified value contained in a quotient of the first difference value and the duration per symbol may be determined as the number of symbols corresponding to the second DRX cycle included in the specified DRX cycle value in each SCS.

The first specified value may be a value agreed in a protocol or a value configured by a network. For example, the first specified value may be 2, 5, or 10, etc., which is not limited in the present disclosure.

For example, the first specified value is 5, and the arrival time interval of service data is 16.66 ms. For a SCS of 15 kHZ, the first DRX cycle value included in the specified DRX cycle value is 10 ms, and the first difference value is 6.66 ms. The quotient of the first difference value and the duration per symbol (0.0714 ms) corresponding to the SCS of 15 kHZ is 93.277, so 90 (the maximum integer multiple of 5) may be determined as the number of symbols corresponding to the second DRX cycle value included in the specified DRX cycle value in the SCS of 15 kHZ.

For another example, the arrival time interval of service data is 16.66 ms. For a SCS of 30 kHZ, the first DRX cycle value included in the specified resource is 10 ms, and the first difference value is 6.66 ms. The quotient of the first difference value and the duration per symbol (0.0357 ms) corresponding to the SCS of 30 kHZ is 186.555, so 185 (the maximum integer multiple of 5) may be determined as the number of symbols corresponding to the second DRX cycle value included in the specified DRX cycle value in the SCS of 30 kHZ.

It should be noted that when calculating the specified DRX cycle value in each SCS, the method as describe in any embodiment of the present disclosure may be used as required, which is not limited in the present disclosure.

In step 404, configuration information of the DRX is sent to a user equipment. A specified DRX cycle value contained in the configuration information is different from any one of default configurable DRX cycle values.

The configuration information of the DRX may further include cell information and/or bandwidth part (BWP) information corresponding to the number of symbols in the specified DRX cycle value. The cell information may include at least one of: a cell group identifier, a cell identifier and a cell type. The BWP information may include at least one of: a BWP identifier and a BWP type.

In embodiments of the present disclosure, since different cells or BWPs may correspond to different symbol durations, when the specified DRX cycle value includes the number of symbols, the configuration information of the DRX may also include the cell information and/or the BWP information, so that the UE can determine a current duration per symbol according to the cell information and/or the BWP information in the configuration information of the DRX, so as to accurately determine the number of symbols included in the specified DRX cycle value.

In embodiments of the present disclosure, the step 404 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 5.

FIG. 5 is a schematic flowchart of a method for determining a DRX provided by embodiments of the present disclosure, which is applied to a network device.

As shown in FIG. 5, the method for determining the DRX includes the following steps.

In step 501, in response to an arrival time interval of any one of service data being different from any one of the default configurable DRX cycle values, a millisecond value m corresponding to a first DRX cycle value included in the specified DRX cycle value in each SCS is determined according to a quotient S of the arrival time interval of the any one of the service data and the duration per slot corresponding to a specified SCS, where m is a positive integer.

The time domain resource allocation information of each SCS may include: a duration per slot and a duration per symbol.

Optionally, the millisecond value m corresponding to the first DRX cycle value may be determined according to the size of the quotient S or the relationship with each default configurable DRX cycle value.

For example, an integer part of the S may be determined as the millisecond value m corresponding to the first DRX cycle value included in the specified DRX cycle value in each SCS.

For example, the arrival time interval of any one of service data is 16.66 ms, a SCS of 15 kHZ is the specified SCS, that is, the duration per slot corresponding to the specified SCS is 1 ms, and the quotient S is 16.66. In this case, 16 may be determined as the millisecond value m corresponding to the first DRX cycle value included in the specified DRX cycle value in each SCS.

Alternatively, a maximum multiple value of a second specified value contained in the S may be determined as the millisecond value m corresponding to the first DRX cycle value included in the specified DRX cycle value in each SCS.

The second specified value may be a value agreed in a protocol or a value configured by a network. For example, the second specified value may be 2, 5, or 10, etc., which is not limited in the present disclosure.

For example, the second specified value is 5. For a service with the arrival time interval of the service data of 16.66 ms, a SCS of 15 kHZ is the specified SCS, that is, the duration per slot corresponding to the specified SCS is 1 ms, and the quotient S is 16.66. In this case, 15 (the maximum multiple of 5) may be determined as the millisecond value m corresponding to the first DRX cycle value included in the specified DRX cycle value in each SCS.

Alternatively, a default configurable DRX cycle value smaller than the S may be determined as the millisecond value m corresponding to the first DRX cycle value included in the specified DRX cycle value in each SCS.

Optionally, when determining the first DRX cycle value, if there are a plurality of default configurable DRX cycle values that are all less than 5, any default configurable DRX cycle value selected from the a plurality of default configurable DRX cycle values may be determined as the millisecond value m corresponding to the first DRX cycle value. Alternatively, a default configurable DRX cycle value with the smallest difference from S may be selected as the millisecond value m corresponding to the first DRX cycle value.

For example, the arrival time interval of any one of the service data is 16.66 ms, a SCS of 15 kHZ is the specified SCS, that is, the duration per slot corresponding to the specified SCS is 1 ms, and the quotient S is 16.66. Since the default configurable DRX cycle value less than S (16.66) is 10 ms, the millisecond value m corresponding to the first DRX cycle value may be determined as 10 ms.

For another example, the arrival time interval of any one of the service data is 33.33 ms, a SCS of 15 kHZ is the specified SCS, that is, the duration per slot corresponding to the specified SCS is 1 ms, and the quotient S is 33.33. Since the default configurable DRX cycle values less than S (33.33) are 10 ms, 20 ms and 32 ms, and the difference between 32 ms and 33.33 is the smallest, the millisecond value m corresponding to the first DRX cycle value may be determined as 32 ms.

In step 502, a second difference value between the arrival time interval of the any one of the service data and the m is determined.

In step 503, the number of symbols corresponding to a second DRX cycle value included in the specified DRX cycle value in each SCS is determined according to the second difference value and the duration per symbol.

In embodiments of the present disclosure, for a specific manner for determining the number of symbols corresponding to the second DRX cycle value included in the specified DRX cycle value in each SCS according to the second difference value and the duration per symbol corresponding to each SCS, reference may be made to the detailed descriptions of any other embodiment, which will not be elaborated here.

In step 504, configuration information of the DRX is sent to a user equipment. A specified DRX cycle value contained in the configuration information is different from any one of default configurable DRX cycle values.

In embodiments of the present disclosure, the step 504 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 6.

FIG. 6 is a schematic flowchart of a method for determining a DRX provided by embodiments of the present disclosure, which is applied to a network device.

As shown in FIG. 6, the method for determining the DRX includes the following steps.

In step 601, in response to an arrival time interval of any one of service data being different from any one of the default configurable DRX cycle values, any one of the default configurable DRX cycle values that is less than the arrival time interval of the any one of the service data is determined as a millisecond value m corresponding to a first DRX cycle value included in the specified DRX cycle value in each SCS.

In this embodiment, for the specific process of determining the first DRX cycle value included in the specified DRX cycle value in each SCS, reference may be made to the detailed descriptions of any other embodiment, which will not be elaborated here.

The m is a positive integer.

In step 602, a first difference value between the arrival time interval of the any one of the service data and the m is determined.

In step 603, a rounded value of a quotient of the first difference value and the duration per slot corresponding to a specified SCS is determined as a millisecond value k corresponding to a second DRX cycle value included in the specified DRX cycle value in each SCS, where the k is a positive integer.

As a possible implementation, the specified DRX cycle value may be a combination of a first DRX cycle value, a second DRX cycle value and a third DRX cycle value, and the first DRX cycle value and the second DRX cycle value each may be a millisecond value, and the third DRX cycle value may be the number of symbols.

Optionally, the quotient of the first difference value and the duration per slot corresponding to the specified SCS may be rounded down, and the rounded value may be determined as the millisecond value k corresponding to the second DRX cycle value included in the specified DRX cycle value in each SCS.

For example, for a service with the arrival time interval of service data of 16.66 ms, the specified SCS is a SCS of 15 kHZ (the duration per slot is 1 ms), the millisecond value m corresponding to the first DRX cycle value included in the specified DRX cycle value is 10, the first difference value is 6.66 ms, and the quotient of the first difference value (6.66 ms) and the duration (1 ms) per slot is 6.66. In this case, the millisecond value corresponding to the second DRX cycle value included in the specified DRX cycle value in each SCS may be determined as 6.

Similarly, for a service with the arrival time interval of service data of 33.33 ms, the specified SCS is a SCS of 15 kHZ (the duration per slot is 1 ms), the millisecond value m corresponding to the first DRX cycle value included in the specified DRX cycle value is 32, the first difference value is 1.33 ms, and the quotient of the first difference value (1.33 ms) and the duration (1 ms) per slot is 1.33. In this case, the millisecond value corresponding to the second DRX cycle value included in the specified DRX cycle value in each SCS may be determined as 1.

In step 604, a third difference value between the first difference value and the k is determined.

In step 605, the number of symbols corresponding to a third DRX cycle value included in the specified DRX cycle value in each SCS is determined according to the third difference value and the duration per symbol.

Optionally, a rounded value of a quotient of the third difference value and the duration per symbol corresponding to each SCS may be determined as the number of symbols corresponding to the third DRX cycle value included in the specified DRX cycle value in each SCS.

The number of symbols corresponding to the third DRX cycle value included in the specified DRX cycle value in each SCS may be determined by means of rounding down, rounding up, or rounding off, and so on.

For example, the arrival time interval of service data is 16.66 ms, for a SCS of 15 kHZ, the first DRX cycle value included in the specified DRX cycle value is 10 ms, and the second DRX cycle value is 6 ms, so the third difference value is 0.66 ms, and the quotient of the third difference value and the duration (0.0714 ms) per symbol corresponding to the SCS of 15 kHZ is 9.243, which is rounded up to a value of 10. In this case, the number of symbols corresponding to the third DRX cycle value included in the specified DRX cycle value corresponding to the SCS of 15 kHZ is 10.

For another example, the arrival time interval of service data is 16.66 ms, for a SCS of 30 kHZ, the first DRX cycle value included in the specified DRX cycle value is 10 ms, and the second DRX cycle value is 6 ms, so the third difference value is 0.66 ms, and the quotient of the third difference value and the duration (0.0357 ms) per symbol corresponding to the SCS of 30 kHZ is 18.49, which is rounded up to a value of 19. In this case, the number of symbols corresponding to the third DRX cycle value included in the specified DRX cycle value corresponding to the SCS of 30 kHZ is 19.

For a service with a data arrival time interval of 16.66 ms (the first DRX cycle value is 10 ms, and the second DRX cycle value is 6 ms) or 33.33 ms (the first DRX cycle value is 32 ms, and the second DRX cycle value is 1 ms), a rounded value of a quotient of the third difference value and the duration per symbol in each SCS may be determined as a configurable value of the third DRX cycle value included in the specified DRX cycle value in each SCS, as shown in Table 4 below.

TABLE 4

| SCS (kHZ) | third DRX cycle value (corresponding to a service with an arrival time interval of 16.66 ms) | third DRX cycle value (corresponding to a service with an arrival time interval of 33.33 ms) |
|---|---|---|
| 15 | 10 | 5 |
| 30 | 19 | 10 |
| 60 (normal CP) | 37 | 19 |
| 60 (extended CP) | 32 | 16 |
| 120 | 74 | 37 |
| 240 | 147 | 74 |

It can be understood that each element or each correspondence in Table 4 exist independently. Even though these elements and correspondences are listed in the same table, it does not mean that all the elements and correspondences in Table 4 must exist at the same time as shown in Table 4, and the value of each element and each correspondence do not depend on the value of any other element or any other correspondence in Table 4. Therefore, those skilled in the art can understand that the value of each element and each correspondence in Table 4 correspond to an independent embodiment.

It should be noted that, the quotient of the third difference value and the duration per symbol in each SCS may be rounded up or rounded down, and the rounded value may be determined as the number of symbols corresponding to the third DRX cycle value included in the specified DRX cycle value in each SCS, which is not limited in the present disclosure.

Optionally, as can be seen from Table 1, there exists a certain multiple relationship among various SCSs in term of the duration per symbol and the duration per slot. In the present disclosure, it is also possible to determine any SCS as a specified SCS, so that after the specified DRX cycle value in the specified SCS is determined, the specified DRX cycle value in each SCS may be determined based on the specified DRX cycle value in the specified SCS.

That is, in the present disclosure, it is also possible to determine a product of a rounded value of a quotient of the third difference value and the duration per symbol corresponding to the specified SCS multiplied by a ratio of the number of slots per frame in each SCS to the number of slots per frame in the specified SCS as the number of symbols corresponding to the third DRX cycle value included in the specified DRX cycle value in each SCS.

In addition, for the extended CP, as compared with the normal CP, when the duration per slot is the same, the number of symbols per slot is different. Therefore, the specified DRX cycle value in the extended CP may be calculated using any method of calculating the specified DRX cycle value as described in the present disclosure.

For example, if a SCS of 15 kHZ (the number of slots per frame is 10) is the specified SCS, in the case where it is determined for a service with the data arrival time interval of 16.66 ms that the first DRX cycle value in the specified DRX cycle value in the SCS of 15 kHZ is 10 ms, the second DRX cycle value is 6 ms, and the third DRX cycle value is 10 symbols (obtained by rounding the value of 9.243 up), it may be determined that the first DRX cycle value in the specified DRX cycle value in the SCS of 30 kHZ (the number of slots per frame is 20) is 10 ms, the second DRX cycle value is 6 ms, and the third DRX cycle value is 10×2=20, where 2 is the ratio of the number of slots per frame in the SCS of 30 kHZ to the number of slots per frame in the SCS of 15 kHZ. Similarly, the specified DRX cycle value in each SCS can be determined.

For a service with the data arrival time interval of 16.66 ms (the first DRX cycle value is 10 ms, and the second DRX cycle value is 6 ms) or 33.33 ms (the first DRX cycle value is 32 ms, and the second DRX cycle value is 1 ms), in the case where the SCS of 15 kHZ is the specified SCS, the value configurable for the third DRX cycle value in the specified DRX cycle value in each SCS may be determined according to the relationship among different SCSs in term of the number of slots per frame, as shown in Table 5 below.

TABLE 5

| SCS (kHZ) | third DRX cycle value (corresponding to a service with an arrival time interval of 16.66 ms) | third DRX cycle value (corresponding to a service with an arrival time interval of 33.33 ms) |
|---|---|---|
| 15 | 10 | 5 |
| 30 | 20 | 10 |
| 60 (normal CP) | 40 | 20 |
| 60 (extended CP) | 32 | 16 |
| 120 | 80 | 40 |
| 240 | 160 | 80 |

It can be understood that each element or each correspondence in Table 5 exist independently. Even though these elements and correspondences are listed in the same table, it does not mean that all the elements and correspondences in Table 5 must exist at the same time as shown in Table 5, and the value of each element and each correspondence do not depend on the value of any other element or any other correspondence in Table 5. Therefore, those skilled in the art can understand that the value of each element and each correspondence in Table 5 correspond to an independent embodiment.

It should be noted that, the specified DRX cycle value in each SCS may be calculated using the method as described in any embodiment of the present disclosure as required, which is not limited in the present disclosure.

In step 606, configuration information of the DRX is sent to a user equipment. A specified DRX cycle value contained in the configuration information is different from any one of default configurable DRX cycle values.

In embodiments of the present disclosure, the step 606 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 7.

FIG. 7 is a schematic flowchart of a method for determining a DRX provided by embodiments of the present disclosure, which is applied to a network device.

As shown in FIG. 7, the method for determining the DRX includes the following steps.

In step 701, in response to an arrival time interval of any one of service data being different from any one of the default configurable DRX cycle values, a quotient S of the arrival time interval of the any one of the service data and the duration per slot corresponding to each SCS is determined.

In step 702, a product of an integer part of the S and the number of symbols per slot corresponding to each SCS is determined as the number of symbols corresponding to a first DRX cycle value included in the specified DRX cycle value in each SCS.

The time domain resource allocation information of each SCS may include: a duration per slot, the number of symbols per slot, and a duration per symbol.

For example, if the arrival time interval of service data is 16.66 ms, the duration per slot corresponding to a SCS of 15 kHZ is 1 ms, and the number of symbols per slot is 14, then, for the SCS of 15 kHZ, the quotient S=16.66, and the number of symbols corresponding to the first DRX cycle value included in the specified DRX cycle value in the SCS of 15 kHZ may be determined as 16×14.

For another example, if the arrival time interval of service data is 16.66 ms, the duration per slot corresponding to a SCS of 30 kHZ is 0.5 ms, and the number of symbols per slot is 14, then, for the SCS of 30 kHZ, the quotient S=33.32, and the number of symbols corresponding to the first DRX cycle value included in the specified DRX cycle value in the SCS of 30 kHZ may be determined as 33×14.

For a service with the data arrival time interval of 16.66 ms or 33.33 ms, when the product of the integer part of the quotient S of the arrival time interval of the service data and the duration per slot corresponding to each SCS multiplied by the number of symbols per slot corresponding to each SCS is determined as the number of symbols corresponding to the first DRX cycle value included in the specified DRX cycle value in each SCS, values configurable for the first DRX cycle value in each SCS may be as shown in Table 6 below:

TABLE 6

| SCS(kHZ) | first DRX cycle value (corresponding to a service with an arrival time interval of 16.66 ms) | first DRX cycle value (corresponding to a service with an arrival time interval of 33.33 ms) |
|---|---|---|
| 15 | 16 × 14 | 33 × 14 |
| 30 | 33 × 14 | 66 × 14 |
| 60 (normal CP) | 66 × 14 | 133 × 14 |
| 60 (extended CP) | 66 × 14 | 133 × 14 |
| 120 | 133 × 14 | 266 × 14 |
| 240 | 266 × 14 | 533 × 14 |

It can be understood that each element or each correspondence in Table 6 exist independently. Even though these elements and correspondences are listed in the same table, it does not mean that all the elements and correspondences in Table 6 must exist at the same time as shown in Table 6, and the value of each element and each correspondence do not depend on the value of any other element or any other correspondence in Table 6. Therefore, those skilled in the art can understand that the value of each element and each correspondence in Table 6 correspond to an independent embodiment.

In step 703, the number of symbols corresponding to a second DRX cycle value included in the specified DRX cycle value in each SCS is determined according to a fractional part of the S and the duration per symbol corresponding to each SCS.

Optionally, a rounded value of a quotient of the fractional part of the quotient S and the duration per symbol in each SCS may be determined as the number of symbols corresponding to the second DRX cycle value included in the specified DRX cycle value in each SCS.

For example, for a service with the data arrival time interval of 16.66 ms or 33.33 ms, when the quotient of the fractional part of the S and the duration per symbol in each SCS is rounded up, and the rounded value is determined as the number of symbols corresponding to the second DRX cycle value included in the specified DRX cycle value in each SCS, values configurable for the second DRX cycle value may be shown in Table 7 below.

TABLE 7

| SCS (kHZ) | third DRX cycle value (corresponding to a service with an arrival time interval of 16.66 ms) | third DRX cycle value (corresponding to a service with an arrival time interval of 33.33 ms) |
|---|---|---|
| 15 | 10 | 5 |
| 30 | 5 | 10 |
| 60 (normal CP) | 9 | 5 |
| 60 (extended CP) | 9 | 5 |
| 120 | 4 | 9 |
| 240 | 8 | 4 |

It can be understood that each element or each correspondence in Table 7 exist independently. Even though these elements and correspondences are listed in the same table, it does not mean that all the elements and correspondences in Table 7 must exist at the same time as shown in Table 7, and the value of each element and each correspondence do not depend on the value of any other element or any other correspondence in Table 7. Therefore, those skilled in the art can understand that the value of each element and each correspondence in Table 7 correspond to an independent embodiment.

It should be noted that the quotient of the fractional part of the S and the duration per symbol in each SCS may also be rounded down or rounded off, and the rounded value may be determined as the number of symbols corresponding to the second DRX cycle value included in the specified DRX cycle value in each SCS, which is not limited in the present disclosure.

Optionally, as can be seen from Table 1, there exists a certain multiple relationship among various SCSs in term of the duration per symbol and the duration per slot. In the present disclosure, it is also possible to determine any SCS as a specified SCS, so that after the number of symbols corresponding to the second DRX cycle value in the specified DRX cycle value in the specified SCS is determined, the number of symbols corresponding to the second DRX cycle value in the specified DRX cycle value in each SCS can be determined based on the number of symbols corresponding to the second DRX cycle value in the specified DRX cycle value in the specified SCS.

That is, in the present disclosure, the rounded value of the quotient of the fractional part of the quotient S and the duration per symbol in the specified SCS may be multiplied by a ratio of the number of slots per frame in each SCS to the number of slots per frame in the specified SCS to obtain a product, and the product may be determined as the number of symbols corresponding to the second DRX cycle value included in the specified DRX cycle value in each SCS.

In addition, for the extended CP, as compared with the normal CP, when the duration per slot is the same, the number of symbols per slot is different. Therefore, the specified DRX cycle value in the extended CP may be calculated using any method of calculating the specified DRX cycle value as described in the present disclosure.

For example, for a service with the data arrival time interval of 16.66 ms or 33.33 ms, when a SCS of 15 kHZ is the specified SCS, values configurable for the second DRX cycle value included in the specified DRX cycle value in each SCS may be determined according to the relationship among different SCSs in term of the number of slots per frame as shown in Table 8 below.

TABLE 8

| SCS(kHZ) | second DRX cycle value (corresponding to a service with an arrival time interval of 16.66 ms) | second DRX cycle value (corresponding to a service with an arrival time interval of 33.33 ms) |
|---|---|---|
| 15 | 10 | 5 |
| 30 | 20 | 10 |
| 60 (normal CP) | 40 | 20 |
| 60 (extended CP) | 32 | 16 |
| 120 | 80 | 40 |
| 240 | 160 | 80 |

It can be understood that each element or each correspondence in Table 8 exist independently. Even though these elements and correspondences are listed in the same table, it does not mean that all the elements and correspondences in Table 8 must exist at the same time as shown in Table 8, and the value of each element and each correspondence do not depend on the value of any other element or any other correspondence in Table 8. Therefore, those skilled in the art can understand that the value of each element and each correspondence in Table 8 correspond to an independent embodiment.

It should be noted that, the specified DRX cycle value in each SCS may be calculated using the method as described in any embodiment of the present disclosure as required, which is not limited in the present disclosure.

Optionally, in the present disclosure, after the number of symbols corresponding to the first DRX cycle value in the specified DRX cycle value in the specified SCS is determined, the number of symbols corresponding to the first DRX cycle value in the specified DRX cycle value in each SCS may also be determined according to the number of symbols corresponding to the first DRX cycle value in the specified DRX cycle value in the specified SCS.

That is, in the present disclosure, it is possible to first determine the first number of symbols corresponding to the first DRX cycle value and the second number of symbols corresponding to the second DRX cycle value included in the specified DRX cycle value in the specified SCS; and then multiply the first number of symbols by a ratio of the number of slots per frame in each SCS to the number of slots per frame in the specified SCS to determine the number of symbols corresponding to the first DRX cycle value included in the specified DRX cycle value in each SCS; and multiply the second number of symbols by a ratio of the number of slots per frame in each SCS to the number of slots per frame in the specified SCS to determine the number of symbols corresponding to the second DRX cycle value included in the specified DRX cycle value in each SCS.

In addition, for the extended CP, as compared with the normal CP, when the duration per slot is the same, the number of symbols per slot is different. Therefore, the specified DRX cycle value in the extended CP may be calculated using any method of calculating the specified DRX cycle value as described in the present disclosure.

For example, for a service with the data arrival time interval of 16.66 ms or 33.33 ms, when a SCS of 15 kHZ is the specified SCS, values configurable for the first DRX cycle value included in the specified DRX cycle value in each SCS may be determined according to the relationship among different SCSs in term of the number of slots per frame as shown in Table 9 below.

TABLE 9

| SCS (kHZ) | first DRX cycle value (corresponding to a service with an arrival time interval of 16.66 ms) | first DRX cycle value (corresponding to a service with an arrival time interval of 33.33 ms) |
|---|---|---|
| 15 | 16 × 14 | 33 × 14 |
| 30 | 32 × 14 | 66 × 14 |
| 60 (normal CP) | 64 × 14 | 132 × 14 |
| 60 (extended CP) | 64 × 14 | 132 × 14 |
| 120 | 128 × 14 | 264 × 14 |
| 240 | 256 × 14 | 528 × 14 |

It can be understood that each element or each correspondence in Table 9 exist independently. Even though these elements and correspondences are listed in the same table, it does not mean that all the elements and correspondences in Table 9 must exist at the same time as shown in Table 9, and the value of each element and each correspondence do not depend on the value of any other element or any other correspondence in Table 9. Therefore, those skilled in the art can understand that the value of each element and each correspondence in Table 9 correspond to an independent embodiment.

In step 704, configuration information of the DRX is sent to a user equipment. A specified DRX cycle value contained in the configuration information is different from any one of default configurable DRX cycle values.

In embodiments of the present disclosure, the step 704 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 8.

FIG. 8 is a schematic flowchart of a method for determining a DRX provided by embodiments of the present disclosure, which is applied to a network device.

As shown in FIG. 8, the method for determining the DRX includes the following steps.

In step 801, in response to an arrival time interval of any one of service data being different from any one of the default configurable DRX cycle values, a duration corresponding to any one of the default configurable DRX cycle values that is less than the arrival time interval of the any one of the service data is determined as a millisecond value m corresponding to a first DRX cycle value included in a specified DRX cycle value in each SCS.

In embodiments of the present disclosure, for the specific process of determining the first DRX cycle value included in the specified DRX cycle value in each SCS, reference may be made to the detailed descriptions of any other embodiment, which will not be elaborated here.

In embodiments of the present disclosure, m is a positive integer.

In step 802, a first difference value between the arrival time interval of the any one of the service data and the m is determined.

In step 803, an integer part of the first difference value is determined as a millisecond value f corresponding to a second DRX cycle value included in the specified DRX cycle value.

As a possible implementation, the specified DRX cycle value may be a combination of a first DRX cycle value, a second DRX cycle value and a third DRX cycle value, and the first DRX cycle value and the second DRX cycle value each may be a millisecond value, and the third DRX cycle value may be the number of sub-milliseconds. Therefore, the integer part of the first difference value may be determined as the millisecond value f corresponding to the second DRX cycle value included in the specified DRX cycle value.

For example, for a service with the arrival time interval of service data of 16.66 ms, the millisecond value m corresponding to the first DRX cycle value included in the specified DRX cycle value is 10, and the first difference value is 6.66 ms, in this case, the millisecond value f corresponding to the second DRX cycle value included in the specified DRX cycle value in each SCS may be determined to be 6.

Similarly, for a service with the arrival time interval of service data of 33.33 ms, the millisecond value m corresponding to the first DRX cycle value included in the specified DRX cycle value is 32, and the first difference value is 1.33 ms, in this case, the millisecond value f corresponding to the second DRX cycle value included in the specified DRX cycle value in each SCS may be determined to be 1.

In step 804, a fourth difference value between the first difference value and the millisecond value f is determined.

In step 805, a quotient of the fourth difference value and a specified reference coefficient is determined as the number of sub-milliseconds corresponding to a third DRX cycle value included in the specified DRX cycle value in each SCS.

The specified reference coefficient may be 1/a. It should be noted that, the specific value of a may be determined as required, which is not limited in embodiments of the present disclosure. For example, a may be 32, so the specified reference coefficient is $\frac{1}{32}$.

As a possible implementation, when the specified DRX cycle value is a combination of the first DRX cycle value, the second DRX cycle value and the third DRX cycle value, the first DRX cycle value and the second DRX cycle value each are a millisecond value, and the third DRX cycle value is the number of milliseconds, the quotient of the fourth difference value between the first difference value and the millisecond value f and the specified reference coefficient may be determined as the number of sub-milliseconds corresponding to the third DRX cycle value.

For example, the arrival time interval of service data is 16.66 ms, and the specified reference coefficient is $\frac{1}{32}$. For the DRX long cycle, the first DRX cycle value included in the specified DRX cycle value in each SCS is 10 ms. At this time, the first difference value is 6.66 ms, that is, the second DRX cycle value is 6, and the fourth difference value is 0.66, so that the number of sub-milliseconds corresponding to the third DRX cycle value included in the specified DRX cycle value in each SCS may be determined as $0.66/(\frac{1}{32})=21$.

For another example, the arrival time interval of service data is 33.33 ms, and the specified reference coefficient is $\frac{1}{32}$. For the DRX long cycle, the first DRX cycle value included in the specified DRX cycle value in each SCS is 32 ms. At this time, the first difference value is 1.33 ms, that is, the second DRX cycle value is 1, and the fourth difference value is 0.33, so that the number of sub-milliseconds corresponding to the third DRX cycle value included in the specified DRX cycle value in each SCS may be determined as $0.33/(\frac{1}{32})=11$.

Optionally, when the quotient of the fourth difference value and the specified reference coefficient is not an integer, the quotient of the fourth difference value and the specified reference coefficient may be rounded, and the rounded value may be determined as the number of sub-milliseconds corresponding to the third DRX cycle value included in the specified DRX cycle value. In embodiments of the present disclosure, the rounding may be rounding down, rounding up, or rounding off, and so on.

In step 806, configuration information of the DRX is sent to a user equipment. A specified DRX cycle value contained in the configuration information is different from any one of default configurable DRX cycle values.

In embodiments of the present disclosure, the step 806 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 9.

FIG. 9 is a schematic flowchart of a method for determining a DRX provided by embodiments of the present disclosure, which is applied to a network device.

As shown in FIG. 9, the method for determining the DRX includes the following steps.

In step 901, in response to an arrival time interval of any one of service data being different from any one of the default configurable DRX cycle values, a rounded value of a quotient of the arrival time interval of the any one of the service data and the duration per symbol in each SCS may be determined as the number of symbols included in the specified DRX cycle value in each SCS.

The time domain resource allocation information of each SCS may include: the duration per symbol.

For example, for a service with the data arrival time interval of 16.66 ms or 33.33 ms, when the quotient of the arrival time interval of the service data and the duration per symbol corresponding to each SCS is rounded down, and the rounded value is determined as the number of symbols included in the specified DRX cycle value in each SCS, values configurable for the specified DRX cycle value in each SCS are shown in Table 10 below.

TABLE 10

| SCS (kHZ) | first DRX cycle value (corresponding to a service with an arrival time interval of 16.66 ms) | first DRX cycle value (corresponding to a service with an arrival time interval of 33.33 ms) |
|---|---|---|
| 15 | 233 | 466 |
| 30 | 466 | 933 |
| 60 (normal CP) | 930 | 1862 |
| 60 (extended CP) | 800 | 1602 |
| 120 | 1871 | 3744 |
| 240 | 3702 | 7406 |

It can be understood that each element or each correspondence in Table 10 exist independently. Even though these elements and correspondences are listed in the same table, it does not mean that all the elements and correspondences in Table 10 must exist at the same time as shown in Table 10, and the value of each element and each correspondence do not depend on the value of any other element or any other correspondence in Table 10. Therefore, those skilled in the art can understand that the value of each element and each correspondence in Table 10 correspond to an independent embodiment.

It should be noted that the quotient of the arrival time interval of the service data and the duration per symbol corresponding to each SCS may also be rounded up or rounded off, and the rounded value may be determined as the number of symbols included in the specified DRX cycle value in each SCS, which is not limited in the present disclosure.

Optionally, as can be seen from Table 1, there exists a certain multiple relationship among various SCSs in term of the duration per symbol and the duration per slot. In the present disclosure, it is also possible to determine any SCS as the specified SCS, so that after the number of symbols included in the specified DRX cycle value in the specified SCS is determined, the number of symbols included in the specified DRX cycle value in each SCS may be determined based on the number of symbols included in the specified DRX cycle value in the specified SCS.

That is, in the present disclosure, it is also possible to multiply the rounded value of the quotient of the arrival time interval of the any one of the service data and the duration per symbol in the specified SCS by a ratio of the number of slots per frame in each SCS to the number of slots per frame in the specified SCS, and determine the product obtained thereby as the number of symbols included in the specified DRX cycle value in each SCS.

In addition, for the extended CP, as compared with the normal CP, when the duration per slot is the same, the number of symbols per slot is different. Therefore, the specified DRX cycle value in the extended CP may be calculated using any method of calculating the specified DRX cycle value as described in the present disclosure.

For example, for a service with the data arrival time interval of 16.66 ms or 33.33 ms, in the case where a SCS of 15 kHZ is the specified SCS, the number of symbols included in the specified DRX cycle value in each SCS may be determined according to the relationship among different SCSs in term of the number of symbols per frame, as shown in Table 11 below.

TABLE 11

| SCS (kHZ) | first DRX cycle value (corresponding to a service with an arrival time interval of 16.66 ms) | first DRX cycle value (corresponding to a service with an arrival time interval of 33.33 ms) |
|---|---|---|
| 15 | 233 | 466 |
| 30 | 466 | 932 |
| 60 (normal CP) | 932 | 1864 |
| 60 (extended CP) | 801 | 1602 |
| 120 | 1864 | 3728 |
| 240 | 3728 | 7456 |

It can be understood that each element or each correspondence in Table 11 exist independently. Even though these elements and correspondences are listed in the same table, it does not mean that all the elements and correspondences in Table 11 must exist at the same time as shown in Table 11, and the value of each element and each correspondence do not depend on the value of any other element or any other correspondence in Table 11. Therefore, those skilled in the art can understand that the value of each element and each correspondence in Table 11 correspond to an independent embodiment.

In step 902, configuration information of the DRX is sent to a user equipment. A specified DRX cycle value contained in the configuration information is different from any one of default configurable DRX cycle values.

In embodiments of the present disclosure, the step 902 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 10.

FIG. 10 is a schematic flowchart of a method for determining a DRX provided by embodiments of the present disclosure, which is applied to a network device.

As shown in FIG. 10, the method for determining the DRX includes the following steps.

In step 1001, in response to an arrival time interval of any one of service data being different from any one of the default configurable DRX cycle values, a quotient of the arrival time interval of the any one of the service data and a specified reference coefficient is determined as the number of sub-milliseconds included in the specified DRX cycle value.

The specified reference coefficient may be 1/a. It should be noted that, the specific value of a may be determined as required, which is not limited in embodiments of the present disclosure. For example, a may be 32, so the specified reference coefficient is $\frac{1}{32}$.

As a possible implementation, the specified DRX cycle value may be represented by the number of sub-milliseconds. Therefore, the quotient of the arrival time interval of the any one of the service data and the specified reference coefficient may be determined as the number of sub-milliseconds included in the specified DRX cycle value.

For example, the arrival time interval of service data is 16.66 ms, and the specified reference coefficient is $\frac{1}{32}$, so the number of sub-milliseconds included in the specified DRX cycle value in each SCS may be determined as $16.66/(\frac{1}{32})$ =533.

For another example, the arrival time interval of service data is 33.33 ms, and the specified reference coefficient is $\frac{1}{32}$, so the number of sub-milliseconds included in the specified DRX cycle value in each SCS may be determined as $33.33/(\frac{1}{32})=1067$.

Optionally, when the quotient of the arrival time interval of the any one of the service data and the specified reference coefficient is not an integer, the quotient of the arrival time interval of the any one of the service data and the specified reference coefficient may be rounded, and the rounded obtained thereby may be determined as the number of sub-milliseconds included in the specified DRX cycle value. In embodiments of the present disclosure, the rounding may be rounding down, rounding up, or rounding off, and so on.

In step 1002, configuration information of the DRX is sent to a user equipment. A specified DRX cycle value contained in the configuration information is different from any one of default configurable DRX cycle values.

In embodiments of the present disclosure, the step 1002 may be implemented in any manner as described in various embodiments of the present disclosure, which is not limited in embodiments of the present disclosure, and will not be elaborated here.

With the method for determining the DRX provided in embodiments of the present disclosure, the network device may indicate to the UE a specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Below, a method for determining a DRX provided by embodiments of the present disclosure will be further described with reference to FIG. 11.

FIG. 11 is a schematic flowchart of a method for determining a DRX provided by embodiments of the present disclosure, which is applied to a UE.

As shown in FIG. 11, the method for determining the DRX includes the following steps.

In step 1101, configuration information of the DRX sent by a network device is received. A specified DRX cycle value contained in the configuration information is different from any one of default configurable DRX cycle values.

The specified DRX cycle value may be a value of any one of following types of DRX cycles: a DRX long cycle, a DRX short cycle, a scheduling period, a retransmission period, a HARQ period and an inactivity period.

Optionally, the specified DRX cycle value may be determined by the network device according to a protocol, or may be determined according to requirements of a current service.

In addition, the above-described configuration information may be a RRC message or a PDCCH control signaling, which is not limited in the present disclosure.

Optionally, in the present disclosure, when determining that an arrival time interval of any one of service data is different from any one of the default configurable DRX cycle values, the network device may determine the specified DRX cycle value according to the arrival time interval of the any one of the service data.

For example, AR or VR services can provide users with video streaming services. The typical video frame rate is 30 frames or 60 frames per second, that is, an arrival time interval of video frames is 33.33 ms or 16.66 ms, which however is different from the default configurable DRX cycle values (such as 10 ms, 20 ms, etc.). Therefore, the network device in the present disclosure is able to determine a current specified DRX cycle value according to the arrival time interval of the video service, and send the specified DRX cycle value to the UE, so that the UE is able to perform uplink and downlink data transmissions with the network device based on the specified DRX cycle value.

Optionally, the specified DRX cycle value may include different content as required. For example, the specified DRX cycle value may include a first DRX cycle value, and the first DRX cycle value may be the number of sub-milliseconds or the number of OFDM symbols.

For example, for a service with a data arrival time interval of 16.66 ms, the specified DRX cycle value may include the number of sub-milliseconds 533 at 15 kHZ.

Optionally, the specified DRX cycle value may also include a combination of a first DRX cycle value and a second DRX cycle value, where the first DRX cycle value may be a millisecond value or the number of symbols, and the second DRX cycle value may also be a millisecond value, the number of symbols or the number of sub-milliseconds, etc., which are not limited in the present disclosure.

For example, for a service with a data arrival time interval of 16.66 ms, the specified resource DRX cycle may include the first DRX cycle value (10 ms) and the second DRX cycle value (10 symbols) at 15 kHZ, where 10 ms is a default configurable DRX cycle value.

Optionally, the specified DRX cycle value may also include a combination of a first DRX cycle value, a second DRX cycle value and a third DRX cycle value, where the first DRX cycle value may be a millisecond value, the second DRX cycle value may also be a millisecond value, and the third DRX cycle value may be the number of symbols or the number of sub-milliseconds, etc., which are not limited in the present disclosure.

For example, for a service with a data arrival time interval of 16.66 ms, the specified resource DRX cycle may include the first DRX cycle value (10 ms), the second DRX cycle value (6 ms) and the third DRX cycle value (10 symbols) at 15 kHZ, where 10 ms is a default configurable DRX cycle value.

In this embodiment, for the manner of determining the specified DRX cycle value, reference may be made to the detailed descriptions of other embodiments of the present disclosure, which will not be elaborated here.

As a possible implementation, when the specified DRX cycle value includes the number of symbols, the UE may also determine cell information and/or BWP information corresponding to the number of symbols.

The cell information may include at least one of: a cell group identifier, a cell identifier and a cell type. The BWP information may include at least one of: a BWP identifier and a BWP type.

Optionally, the configuration information of the DRX received by the UE may include the cell information and/or the BWP information corresponding to the number of symbols. Therefore, after receiving the configuration information of the DRX sent by the network device, the UE may parse the configuration information of the DRX to determine the cell information and/or the BWP information corresponding to the number of symbols.

Optionally, the network device may also agree on the cell information and/or the BWP information corresponding to the number of symbols through a protocol, so that the UE can determine the cell information and/or the BWP information corresponding to the number of symbols included in the specified DRX cycle value sent by the network device according to the pre-agreed protocol with the network device.

As a possible implementation, since the activated cell or BWP may be switched during the data transmission between the network device and the UE, and the duration per symbol corresponding to different cells (or BWPs) may be different, when the currently activated cell is different from the cell in the configuration information (or the currently activated BWP is different from the BWP in the configuration information), the UE may update the number of symbols in the specified DRX cycle value according to the currently activated cell or BWP to ensure the accuracy of the determination of the specified DRX cycle value. That is, in a possible implementation of embodiments of the present disclosure, the number of symbols corresponding to the current BWP or cell may be determined in the following manner.

Manner 1

In response to the currently activated BWP being different from the BWP in the configuration information, the number of symbols corresponding to the currently activated BWP is calculated according to a ratio of a SCS of the currently activated BWP to a SCS of the BWP in the configuration information and the number of symbols included in the specified DRX cycle value.

Optionally, when the configuration information includes the BWP information, and the currently activated BWP is different from the BWP in the configuration information, a quotient of the number of symbols included in the specified DRX cycle value and a ratio of the duration per symbol in the SCS of the currently activated BWP to the duration per symbol in the SCS of the BWP in the configuration information may be determined as the number of symbols corresponding to the currently activated BWP.

Manner 2

The number of symbols corresponding to the currently activated BWP is calculated according to a SCS of the currently activated BWP and the number of symbols included in the specified DRX cycle value.

Optionally, when the configuration information does not include the BWP information, a combination mode of the specified DRX cycle value may be determined according to the number of symbols included in the specified DRX cycle value, and then the number of symbols corresponding to the currently activated BWP may be re-determined according to the determining method of the number of symbols corresponding to the combination mode of the specified DRX cycle value as disclosed in the above embodiments and the SCS of the currently activated BWP.

Manner 3

The number of symbols corresponding to the currently activated cell is calculated according to a SCS of the currently activated cell and the number of symbols included in the specified DRX cycle value.

Optionally, when the configuration information does not include the cell information, a combination mode of the specified DRX cycle value may be determined according to the number of symbols included in the specified DRX cycle value, and then the number of symbols corresponding to the currently activated cell may be re-determined according to the determining method of the number of symbols corresponding to the combination mode of the specified DRX cycle value as disclosed in the above embodiments and the SCS of the currently activated cell.

Manner 4

In response to the currently activated cell being different from a cell in the configuration information, the number of symbols corresponding to the currently activated cell is calculated according to a ratio of a SCS of the currently activated cell to a SCS of the cell in the configuration information and the number of symbols included in the specified DRX cycle value.

Optionally, when the configuration information includes the cell information, and the currently activated cell is different from the cell in the configuration information, a quotient of the number of symbols included in the specified DRX cycle value and a ratio of the duration per symbol in the SCS of the currently activated cell to the duration per symbol in the SCS of the cell in the configuration information may be determined as the number of symbols corresponding to the currently activated cell.

As a possible implementation, when the currently activated BWP is different from the BWP in the configuration information (or the currently activated cell is different from the cell in the configuration information), or the currently activated BWP changes (or the currently activated cell changes), a timer corresponding to the specified DRX cycle value may be stopped or restarted, so that the timer is restarted after the number of symbols included in the specified DRX cycle value is re-determined. That is, in a possible implementation of embodiments of the present disclosure, the above method may further include:

in response to the currently activated BWP being different from the BWP in the configuration information, stopping or restarting a timer corresponding to the specified DRX cycle value; or in response to the currently activated BWP being different from a historically activated BWP, stopping or restarting a timer corresponding to the specified DRX cycle value; or in response to the currently activated cell being different from a historically activated cell, stopping or restarting a timer corresponding to the specified DRX cycle value; or in response to the currently activated cell being different from the cell in the configuration information, stopping or restarting a timer corresponding to the specified DRX cycle value.

In step 1102, a control channel is monitored based on the specified DRX cycle.

After determining the specified DRX cycle value corresponding to the DRX according to the configuration information of the DRX sent by the network device, the UE can monitor the control channel according to the configured specified DRX cycle value to receive downlink data sent by the network device.

It can be understood that, in the present disclosure, the configuration information of the DRX received by the UE is sent by the network device according to the arrival time interval of the service data when the network device determines that the arrival time interval of any one of the service data is different from each of the default configurable DRX cycle values, so as to enable the specified DRX cycle value indicated to match the arrival time interval of the service data as much as possible, thereby reducing the transmission delay of the service data.

In the method for determining the DRX according to embodiments of the present disclosure, the UE performs data transmission with the network device based on the acquired specified DRX cycle value that matches the arrival time interval of the service data, thereby minimizing the service data transmission delay, and improving the quality and performance of the service.

In order to implement the above embodiments, the present disclosure also proposes a device for determining a DRX.

FIG. 12 is a schematic diagram of a device for determining a DRX provided by embodiments of the present disclosure, which is applied to a network device.

As shown in FIG. 12, the device 1200 for determining the DRX includes a sending module 1201.

The sending module 1201 is configured to send configuration information of the DRX to a UE. A specified DRX cycle value contained in the configuration information is different from any one of default configurable DRX cycle values.

In actual use, the device for determining the DRX provided by embodiments of the present disclosure may be configured in any network device to execute the method for determining the DRX as described hereinbefore.

The device for determining the DRX provided by embodiments of the present disclosure may indicate to the UE the specified DRX cycle value that matches an arrival time interval of service data when determining that the arrival time interval of any one of the service data is different from each of default configurable DRX cycle values, and perform data transmission with the UE based on the specified DRX cycle value, thereby minimizing the service data transmission delay, and improving the quality and performance of the service.

In a possible implementation of the present disclosure, the above-described specified DRX cycle value is a value of any one of following types of DRX cycles: a DRX long cycle, a DRX short cycle, a scheduling period, a retransmission period, a HARQ period and an inactivity period.

Further, in another possible implementation of the present disclosure, the above device 1200 for determining the DRX further includes a first determining module or a second determining module.

The first determining module is configured to determine the specified DRX cycle value in each subcarrier spacing (SCS) according to time domain resource allocation information corresponding to each SCS.

The second determining module is configured to determine the specified DRX cycle value in each SCS based on the specified DRX cycle value in a specified SCS.

Further, in another possible implementation of the present disclosure, the first determining module or the second determining module is further configured to: determine the number of symbols, a millisecond value and/or the number of sub-milliseconds included in the specified DRX cycle value in each SCS.

Further, in another possible implementation of the present disclosure, the specified DRX cycle value is any one of:
a first DRX cycle value,
a combination of a first DRX cycle value and a second DRX cycle value, or
a combination of a first DRX cycle value, a second DRX cycle value and a third DRX cycle value.

Further, in another possible implementation of the present disclosure, the above device 1200 for determining the DRX further includes a third determining module.

The third determining module is configured to: in response to an arrival time interval of any one of service data being different from any one of the default configurable DRX cycle values, determine the specified DRX cycle value according to the arrival time interval of the any one of the service data.

Further, in another possible implementation of the present disclosure, the third determining module is further configured to: determine any one of the default configurable DRX cycle values that is less than the arrival time interval of the any one of the service data as a millisecond value m corresponding to a first DRX cycle value included in the specified DRX cycle value, where the m is a positive integer; and determine a first difference value between the arrival time interval of the any one of the service data and the m as a millisecond value corresponding to a second DRX cycle value included in the specified DRX cycle value.

Further, in another possible implementation of the present disclosure, the third determining module is further configured to: determine a duration corresponding to any one of the default configurable DRX cycle values that is less than the arrival time interval of the any one of the service data as a millisecond value m corresponding to a first DRX cycle value included in the specified DRX cycle value, where the m is a positive integer; determine a first difference value between the arrival time interval of the any one of the service data and the m; and determine a quotient of the first difference value and a specified reference coefficient as the number of sub-milliseconds corresponding to a second DRX cycle value included in the specified DRX cycle value.

Further, in another possible implementation of the present disclosure, the time domain resource allocation information of each SCS includes: a duration per slot and a duration per symbol; and correspondingly, the third determining module is further configured to: determine a duration corresponding to any one of the default configurable DRX cycle values that is less than the arrival time interval of the any one of the service data as a millisecond value m corresponding to a first DRX cycle value included in the specified DRX cycle value in each SCS, where m is a positive integer; determine a first difference value between the arrival time interval of the any one of the service data and the m; and determine the number of symbols corresponding to a second DRX cycle value included in the specified DRX cycle value in each SCS according to the first difference value and the duration per symbol.

Further, in another possible implementation of the present disclosure, the third determining module is further configured to: determine a rounded value of a quotient of the first difference value and the duration per symbol in each SCS as the number of symbols corresponding to the second DRX cycle value included in the specified DRX cycle value in each SCS; or determine a product of a rounded value of a quotient of the first difference value and the duration per symbol in the specified SCS multiplied by a ratio of the number of slots per frame in each SCS to the number of slots per frame in the specified SCS as the number of symbols corresponding to the second DRX cycle value included in the specified DRX cycle value in each SCS; or determine a maximum integer multiple of a first specified value contained in a quotient of the first difference value and the duration per symbol as the number of symbols corresponding to the second DRX cycle included in the specified DRX cycle value in each SCS.

Further, in another possible implementation of the present disclosure, the time domain resource allocation information of each SCS includes: a duration per slot and a duration per symbol; and correspondingly, the third determining module is further configured to: determine a millisecond value m corresponding to a first DRX cycle value included in the specified DRX cycle value in each SCS according to a quotient S of the arrival time interval of the any one of the service data and the duration per slot corresponding to a specified SCS, where m is a positive integer; determine a second difference value between the arrival time interval of the any one of the service data and the m; and determine the number of symbols corresponding to a second DRX cycle value included in the specified DRX cycle value in each SCS according to the second difference value and the duration per symbol.

Further, in another possible implementation of the present disclosure, the third determining module is further configured to: determine an integer part of the S as the millisecond value m corresponding to the first DRX cycle value included in the specified DRX cycle value in each SCS; or determine a maximum multiple value of a second specified value contained in the S as the millisecond value m corresponding to the first DRX cycle value included in the specified DRX cycle value in each SCS; or determine a default configurable DRX cycle value smaller than the S as the millisecond value m corresponding to the first DRX cycle value included in the specified DRX cycle value in each SCS.

Further, in another possible implementation of the present disclosure, the time domain resource allocation information of each SCS includes: a duration per slot and a duration per symbol, and correspondingly, the third determining module is further configured to: determine any one of the default configurable DRX cycle values that is less than the arrival time interval of the any one of the service data as a millisecond value m corresponding to a first DRX cycle value included in the specified DRX cycle value in each SCS, where the m is a positive integer; determine a first difference value between the arrival time interval of the any one of the service data and the m; determine a rounded value of a quotient of the first difference value and the duration per slot corresponding to a specified SCS as a millisecond value k corresponding to a second DRX cycle value included in the specified DRX cycle value in each SCS, where the k is a positive integer; determine a third difference value between the first difference value and the k; and determine the number of symbols corresponding to a third DRX cycle value included in the specified DRX cycle value in each SCS according to the third difference value and the duration per symbol.

Further, in another possible implementation of the present disclosure, the third determining module is further configured to: determine a rounded value of a quotient of the third difference value and the duration per symbol in each SCS as the number of symbols corresponding to the third DRX cycle value included in the specified DRX cycle value in each SCS; or determine a product of a rounded value of a quotient of the third difference value and the duration per symbol in the specified SCS multiplied by a ratio of the number of slots per frame in each SCS to the number of slots per frame in the specified SCS as the number of symbols corresponding to the third DRX cycle value included in the specified DRX cycle value in each SCS.

Further, in another possible implementation of the present disclosure, the time domain resource allocation information of each SCS includes: a duration per slot, the number of symbols per slot, and a duration per symbol, and correspondingly, the third determining module is further configured to: determine a quotient S of the arrival time interval of the any one of the service data and the duration per slot corresponding to each SCS; determine a product of an integer part of the S and the number of symbols per slot corresponding to each SCS as the number of symbols corresponding to a first DRX cycle value included in the specified DRX cycle value in each SCS; and determine the number of symbols corresponding to a second DRX cycle value included in the specified DRX cycle value in each SCS according to a fractional part of the S and the duration per symbol corresponding to each SCS.

Further, in another possible implementation of the present disclosure, the third determining module is further configured to: determine a rounded value of a quotient of the fractional part of the S and the duration per symbol in each SCS as the number of symbols corresponding to the second DRX cycle value included in the specified DRX cycle value in each SCS; or determine a product of a rounded value of a quotient of the fractional part of the S and the duration per symbol in a specified SCS multiplied by a ratio of the number of slots per frame in each SCS to the number of slots per frame in the specified SCS as the number of symbols corresponding to the second DRX cycle value included in the specified DRX cycle value in each SCS.

Further, in another possible implementation of the present disclosure, the time domain resource allocation information of each SCS includes: a duration per symbol, and correspondingly, the third determining module is further configured to: determine a first number of symbols corresponding to a first DRX cycle value included in the specified DRX cycle value in a specified SCS and a second number of symbols corresponding to a second DRX cycle value included in the specified DRX cycle value in the specified SCS; determine a product of the first number of symbols multiplied by a ratio of the number of slots per frame in each SCS to the number of slots per frame in the specified SCS as the number of symbols corresponding to the first DRX cycle value included in the specified DRX cycle value in each SCS; and determine a product of the second number of symbols multiplied by the ratio of the number of slots per frame in each SCS to the number of slots per frame in the specified SCS as the number of symbols corresponding to the second DRX cycle value included in the specified DRX cycle value in each SCS.

Further, in another possible implementation of the present disclosure, the third determining module is further configured to: determine a duration corresponding to any one of the default configurable DRX cycle values that is less than the arrival time interval of the any one of the service data as a millisecond value m corresponding to a first DRX cycle value included in the specified DRX cycle value in each SCS, where the m is a positive integer; determine a first difference value between the arrival time interval of the any one of the service data and the m; determine an integer part of the first difference value as a millisecond value f corresponding to a second DRX cycle value included in the specified DRX cycle value; determine a fourth difference value between the first difference value and the millisecond value f, and determine a quotient of the fourth difference value and a specified reference coefficient as the number of sub-milliseconds corresponding to a third DRX cycle value included in the specified DRX cycle value in each SCS.

Further, in another possible implementation of the present disclosure, the time domain resource allocation information of each SCS includes: a duration per symbol, and correspondingly, the third determining module is further configured to: determine a rounded value of a quotient of the arrival time interval of the any one of the service data and the duration per symbol in each SCS as the number of symbols included in the specified DRX cycle value in each SCS; or determine a product of a rounded value of a quotient of the arrival time interval of the any one of the service data and the duration per symbol in a specified SCS multiplied by a ratio of the number of slots per frame in each SCS to the number of slots per frame in the specified SCS as the number of symbols included in the specified DRX cycle value in each SCS.

Further, in another possible implementation of the present disclosure, the configuration information of the DRX further includes cell information and/or bandwidth part (BWP) information corresponding to the number of symbols in the specified DRX cycle value.

Further, in another possible implementation of the present disclosure, the cell information includes at least one of: a cell group identifier, a cell identifier and a cell type.

Further, in another possible implementation of the present disclosure, the BWP information includes at least one of: a BWP identifier and a BWP type.

Further, in another possible implementation of the present disclosure, the third determining module is further configured to: determine a quotient of the arrival time interval of the any one of the service data and a specified reference coefficient as the number of sub-milliseconds included in the specified DRX cycle value.

It should be noted that the foregoing explanations of embodiments of the methods for determining the DRX shown in FIG. 1 to FIG. 10 are also applicable to the device 1200 for determining the DRX in this embodiment, which will not be elaborated here.

The device for determining the DRX provided by embodiments of the present disclosure may indicate to the UE the specified DRX cycle value that matches the arrival time interval of the service data when determining that the arrival time interval of any one of the service data is different from each of the default configurable DRX cycle values, and perform data transmission with the UE based on the specified DRX cycle value, thereby minimizing the service data transmission delay, and improving the quality and performance of the service.

In order to implement the above embodiments, the present disclosure also proposes a device for determining a DRX.

FIG. 13 is a schematic diagram of another device for determining a DRX provided by embodiments of the present disclosure, which is applied to a UE.

As shown in FIG. 13, the device 1300 for determining the DRX includes: a receiving module 1301 and a monitoring module 1302.

The receiving module 1301 is configured to receive configuration information of the DRX sent by a network device. A specified DRX cycle value contained in the configuration information is different from any one of default configurable DRX cycle values.

The monitoring module 1302 is configured to monitor a control channel based on the specified DRX cycle.

In actual use, the device for determining the DRX provided by embodiments of the present disclosure may be configured in any UE to execute the method for determining the DRX as described hereinbefore.

The device for determining the DRX provided by embodiments of the present disclosure performs data transmission with the network device based on the acquired specified DRX cycle value that matches the arrival time interval of the service data, thereby minimizing the service data transmission delay, and improving the quality and performance of the service.

In a possible implementation of the present disclosure, the specified DRX cycle value is any one of:

a first DRX cycle value, a combination of the first DRX cycle value and a second DRX cycle value, or a combination of the first DRX cycle value, the second DRX cycle value and a third DRX cycle value.

Further, in another possible implementation of the present disclosure, the specified DRX cycle value includes the first DRX cycle value and the second DRX cycle value, and the first DRX cycle value is a default configurable DRX cycle value.

Further, in another possible implementation of the present disclosure, the configuration information includes the number of symbols, a millisecond value and/or a sub-millisecond value included in the specified DRX cycle value in each SCS.

Further, in another possible implementation of the present disclosure, the specified DRX cycle value includes the number of symbols; and correspondingly, the device 1300 for determining the DRX further includes: fourth determining module.

The fourth determining module is configured to determine cell information and/or bandwidth part (BWP) information corresponding to the number of symbols.

Further, in another possible implementation of the present disclosure, the cell information includes at least one of: a cell group identifier, a cell identifier and a cell type.

Further, in another possible implementation of the present disclosure, the BWP information includes at least one of: a BWP identifier and a BWP type.

Further, in another possible implementation of the present disclosure, the device 1300 for determining the DRX further includes: a first calculating module, a second calculating module, a third calculating module, or a fourth calculating module.

The first calculating module is configured to: in response to a currently activated BWP being different from a BWP in the configuration information, calculate the number of symbols corresponding to the currently activated BWP according to a ratio of a SCS of the currently activated BWP to a SCS of the BWP in the configuration information, and the number of symbols included in the specified DRX cycle value.

The second calculating module is configured to: calculate the number of symbols corresponding to a currently activated BWP according to a SCS of the currently activated BWP and the number of symbols included in the specified DRX cycle value.

The third calculating module is configured to: calculate the number of symbols corresponding to a currently activated cell according to a SCS of the currently activated cell and the number of symbols included in the specified DRX cycle value.

The fourth calculating module is configured to: in response to a currently activated cell being different from a cell in the configuration information, calculate the number of symbols corresponding to the currently activated cell according to a ratio of a SCS of the currently activated cell to a SCS of the cell in the configuration information, and the number of symbols included in the specified DRX cycle value.

Further, in another possible implementation of the present disclosure, the device 1300 for determining the DRX further includes: a first processing module, a second processing module, a third processing module, or a fourth processing module.

The first processing module is configured to: stop or restart a timer corresponding to the specified DRX cycle value, in response to the currently activated BWP being different from the BWP in the configuration information.

The second processing module is configured to: stop or restart a timer corresponding to the specified DRX cycle value, in response to the currently activated BWP being different from a historically activated BWP.

The third processing module is configured to: stop or restart a timer corresponding to the specified DRX cycle value, in response to the currently activated cell being different from a historically activated cell.

The fourth processing module is configured to: stop or restart a timer corresponding to the specified DRX cycle value, in response to the currently activated cell being different from the cell in the configuration information.

Further, in another possible implementation of the present disclosure, the specified DRX cycle value is a value of any one of following types of DRX cycles: a DRX long cycle, a DRX short cycle, a scheduling period, a retransmission period, a HARQ period and an inactivity period.

It should be noted that the foregoing explanations of embodiments of the method for determining the DRX shown in FIG. 11 are also applicable to the device 1300 for determining the DRX in this embodiment, which will not be elaborated here.

The device for determining the DRX provided by embodiments of the present disclosure may indicate to the UE the specified DRX cycle value that matches the arrival time interval of the service data when determining that the arrival time interval of any one of the service data is different from each of the default configurable DRX cycle values, and perform data transmission with the UE based on the specified DRX cycle value, thereby minimizing the service data transmission delay, and improving the quality and performance of the service.

It should be noted that, the foregoing explanations of embodiments of the method for determining the DRX shown in FIG. 11 is also applicable to the device 1300 for determining the DRX in this embodiment, and details are not repeated here.

The device for determining the DRX provided by the embodiments of the present disclosure performs data transmission with the network device based on the acquired specified DRX cycle value that matches the arrival time interval of the service data, thereby minimizing the service data transmission delay, and improving the quality and performance of the service.

In order to implement the above embodiments, the present disclosure also proposes a communication device.

The communication device provided by embodiments of the present disclosure includes a processor, a transceiver, a memory, and an executable program stored in the memory and runnable by the processor. The processor executes the method for determining the DRX provided by any of the foregoing technical solutions when running the executable program.

The communication device may be the aforementioned UE or network device.

The processor may include various types of storage media, which are non-transitory computer storage media that can continue memorizing information stored thereon when the communication device is powered off. Here, the communication device includes a UE or a network device.

The processor may be connected to the memory through a bus or the like, for reading the executable program stored on the memory, for example, as at least one of FIG. 1 to FIG. 10.

In order to implement the above embodiments, the present disclosure also proposes a computer storage medium.

The computer storage medium provided by embodiments of the present disclosure has stored thereon an executable program that, when executed by a processor, cause the method for determining the DRX provided by any of the foregoing technical solutions, for example as shown in FIG. 1 to FIG. 11, to be implemented.

FIG. 14 is a block diagram of a UE 1400 provided by embodiments of the present disclosure. For example, the UE 1400 may be a mobile phone, a computer, a digital broadcast user equipment, a messaging device, a game console, a tablet device, a medical device, a fitness device, a personal digital assistant, or the like.

Referring to FIG. 14, the UE 1400 may include at least one of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the UE 1400, such as the operations associated with display, phone calls, data communications, camera operations, and recording operations. The processing component 1402 may include at least one processor 1420 to execute instructions to perform all or some of the steps in the above-described methods. Moreover, the processing component 1402 may include at least one module which facilitates the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the UE 1400. Examples of such data include instructions for any applications or methods operated on the UE 1400, contact data, phonebook data, messages, pictures, videos, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the UE 1400. The power component 1406 may include a power management system, at least one power source, and any other components associated with the generation, management, and distribution of power in the UE 1400.

The multimedia component 1408 includes a screen providing an output interface between the UE 1400 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake-up time and a pressure associated with the touch or swipe action. In some embodiments, the multimedia component 1408 includes a front camera and/or a rear camera. The front camera and/or the rear camera may receive an external multimedia datum while the UE 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the UE 1400 is in an operation mode, such as a call mode, a recording mode, and a voice recognition mode. The received audio signal may be further stored in the memory 1404 or sent via the communication component 1416. In some embodiments, the audio component 1410 further includes a speaker to output audio signals.

The I/O interface 1412 provides an interface between the processing component 1402 and peripheral interface modules, such as keyboards, click wheels, buttons, and the like. The buttons may include, but are not limited to, a home button, a volume button, a starting button, and a locking button.

The sensor component 1414 includes at least one sensor to provide status assessments of various aspects of the UE 1400. For instance, the sensor component 1414 may detect an open/closed status of the UE 1400, relative positioning of components, e.g., the display and the keypad, of the UE 1400, a change in position of the UE 1400 or a component of the UE 1400, a presence or absence of user contact with the UE 1400, an orientation or an acceleration/deceleration of the UE 1400, and a change in temperature of the UE 1400. The sensor component 1414 may include a proximity sensor configured to detect the presence of nearby objects without any physical contact. The sensor component 1414 may further include a light sensor, such as a CMOS or CCD image sensor, for use in imaging applications. In some embodiments, the sensor component 1414 may further include an accelerometer sensor, a gyroscope sensor, a magnetic sensor, a pressure sensor, or a temperature sensor.

The communication component 1416 is configured to facilitate communication, wired or wireless, between the UE 1400 and other devices. The UE 1400 can access a wireless network based on a communication standard, such as WiFi, 2G, 3G, 4G, 5G, new radio (NR) or a combination thereof. In an illustrative embodiment, the communication component 1416 receives a broadcast signal or broadcast associated information from an external broadcast management system via a broadcast channel. In an illustrative embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 1404, executable by the processor 1420 in the UE 1400, for completing the above-mentioned method. For example, the non-transitory computer-readable storage medium may be a ROM, a random access memory (RAM), a CD-ROM, a magnetic tape, a floppy disc, an optical data storage device, and the like.

Figure 15:
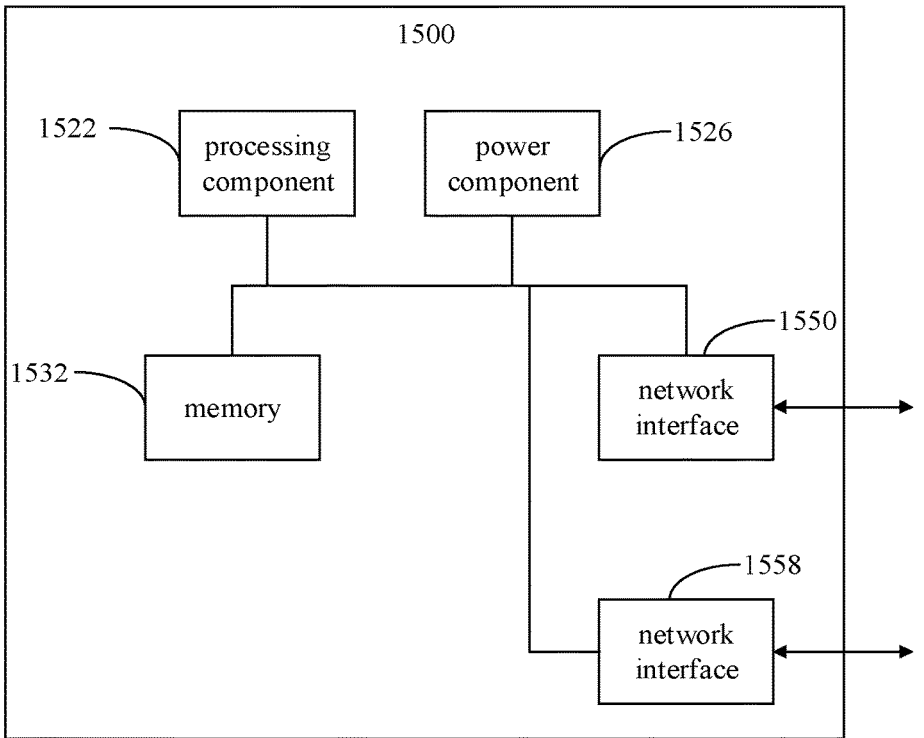
FIG. 15 is a schematic diagram of a base station provided by embodiments of the present disclosure.

FIG. 15 is a schematic diagram of a base station provided by embodiments of the present disclosure, as shown in FIG. 15, for example, the base station 1500 may be provided as a network device. Referring to FIG. 15, the base station 1500 includes a processing component 1522, which further includes at least one processor and a memory resource represented by a memory 1532 for storing instructions executable by the processing component 1522, such as application programs. The application program stored in the memory 1532 may include one or more modules each corresponding to a set of instructions. In addition, the processing component 1522 is configured to execute instructions, so as to execute any of the aforementioned methods applied to the base station, for example, the methods shown in FIG. 9 and FIG. 10.

The base station 1500 further includes a power component 1526 configured to execute power management of the base station 1500, a wired or wireless network interface 1550 configured to connect the base station 1500 to the network, and an input/output (I/O) interface 1558. The base station 1500 may operate an operating system stored in the memory 1532, such as Windows Server™, Mac OS X™, Unix™, Linux™, FreeBSD™, or the like.

According to a seventh aspect of embodiments of the present disclosure, there is provided a computer program product, which includes a computer program that, when executed by a processor in a communication device, causes the method for determining the DRX as described above to be implemented.

With the method and device for determining the DRX, the communication device, and the computer-readable storage medium provided by embodiments of the present disclosure, the network device may indicate to the UE the specified DRX cycle value that matches an arrival time interval of service data when the network device determines that the arrival time interval of any one of the service data is different from each of default configurable DRX cycle values, and perform data transmission with the UE based on the specified DRX cycle value, thereby minimizing the service data transmission delay, and improving the quality and performance of the service.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claim

What is claimed is:

1. A method for determining a discontinuous reception (DRX), performed by a network device, comprising:
   sending configuration information of the DRX to a user equipment, wherein a specified DRX cycle value contained in the configuration information is different from any one of default configurable DRX cycle values;
   wherein the specified DRX cycle value comprises a count of sub-milliseconds, and the sub-millisecond is a time measuring unit less than a millisecond;
   further comprising:
   determining the specified DRX cycle value according to an arrival time interval of any one of service data, wherein the arrival time interval of any one of the service data is different from any one of the default configurable DRX cycle values;
   wherein determining the specified DRX cycle value comprises:
   determining the count of sub-milliseconds comprised in the specified DRX cycle value, wherein the count of sub-milliseconds included in the specified DRX cycle value is a quotient of the arrival time interval of any one of the service data and a specified reference coefficient.

2. The method according to claim 1, further comprising:
   determining the specified DRX cycle value in each subcarrier spacing (SCS) according to time domain resource allocation information corresponding to each SCS; or
   determining the specified DRX cycle value in each SCS based on the specified DRX cycle value in a specified SCS.

3. The method according to claim 1, wherein determining the specified DRX cycle value comprises:
   determining a first DRX cycle value, where the first DRX cycle value is any one of the default configurable DRX cycle values that is less than the arrival time interval of the any one of the service data; and
   determining a second DRX cycle value, wherein the second DRX cycle value is a first difference value between the arrival time interval of the any one of the service data and the first DRX cycle value,
   wherein the specified DRX cycle value includes a combination of the first DRX cycle value and the second DRX cycle value.

4. The method according to claim 1, wherein determining the specified DRX cycle value comprises:
   determining a first DRX cycle value included in the specified DRX cycle value, wherein the first DRX cycle value is a duration corresponding to any one of the default configurable DRX cycle values that is less than the arrival time interval of the any one of the service data;
   determining a first difference value between the arrival time interval of the any one of the service data and the first DRX cycle value; and
   determining a number of sub-milliseconds corresponding to a second DRX cycle value included in the specified DRX cycle value, wherein the number of sub-milliseconds corresponding to the second DRX cycle value is a quotient of the first difference value and a specified reference coefficient.

5. The method according to claim 1, wherein time domain resource allocation information of each SCS comprises: a duration per slot and a duration per symbol, and determining the specified DRX cycle value comprises:

determining a first DRX cycle value included in the specified DRX cycle value in each SCS, wherein the first DRX cycle value is a duration corresponding to any one of the default configurable DRX cycle values that is less than the arrival time interval of the any one of the service data;

determining a first difference value between the arrival time interval of the any one of the service data and the first DRX cycle value; and determining a number of symbols corresponding to a second DRX cycle value included in the specified DRX cycle value in each SCS according to the first difference value and the duration per symbol.

6. The method according to claim 5, wherein determining the number of symbols corresponding to the second DRX cycle value included in the specified DRX cycle value in each SCS according to the first difference value and the duration per symbol comprises:

determining a rounded value of a quotient of the first difference value and the duration per symbol in each SCS as the number of symbols corresponding to the second DRX cycle value included in the specified DRX cycle value in each SCS; or determining a product of a rounded value of a quotient of the first difference value and the duration per symbol in a specified SCS multiplied by a ratio of the number of slots per frame in each SCS to the number of slots per frame in the specified SCS, as the number of symbols corresponding to the second DRX cycle value included in the specified DRX cycle value in each SCS; or determining a maximum integer multiple of a first specified value contained in a quotient of the first difference value and the duration per symbol as the number of symbols corresponding to the second DRX cycle included in the specified DRX cycle value in each SCS.

7. The method according to claim 1, wherein time domain resource allocation information of each SCS comprises: a duration per slot and a duration per symbol, and determining the specified DRX cycle value comprises:

determining a first DRX cycle value included in the specified DRX cycle value in each SCS according to a quotient S of the arrival time interval of the any one of the service data and the duration per slot corresponding to a specified SCS;

determining a second difference value between the arrival time interval of the any one of the service data and the first DRX cycle value; and determining a number of symbols corresponding to a second DRX cycle value included in the specified DRX cycle value in each SCS according to the second difference value and the duration per symbol.

8. The method according to claim 7, wherein determining the first DRX cycle value included in the specified DRX cycle value in each SCS according to the quotient S of the arrival time interval of the any one of the service data and the duration per slot corresponding to the specified SCS comprises:

determining an integer part of the S as the first DRX cycle value included in the specified DRX cycle value in each SCS; or determining a maximum multiple value of a second specified value contained in the S as the first DRX cycle value included in the specified DRX cycle value in each SCS; or determining a default configurable DRX cycle value less than the S as the first DRX cycle value included in the specified DRX cycle value in each SCS.

9. The method according to claim 1, wherein time domain resource allocation information of each SCS comprises: a duration per slot and a duration per symbol, and determining the specified DRX cycle value comprises:

determining a first DRX cycle value included in the specified DRX cycle value in each SCS, wherein the first DRX cycle value is any one of the default configurable DRX cycle values that is less than the arrival time interval of the any one of the service data;

determining a first difference value between the arrival time interval of the any one of the service data and the first DRX cycle value;

determining a second DRX cycle value included in the specified DRX cycle value in each SCS, wherein the second DRX cycle value is a rounded value of a quotient of the first difference value and the duration per slot corresponding to a specified SCS;

determining a third difference value between the first difference value and the second DRX cycle value; and determining a number of symbols corresponding to a third DRX cycle value included in the specified DRX cycle value in each SCS according to the third difference value and the duration per symbol.

10. The method according to claim 9, wherein determining the number of symbols corresponding to the third DRX cycle value included in the specified DRX cycle value in each SCS according to the third difference value and the duration per symbol comprises:

determining a rounded value of a quotient of the third difference value and the duration per symbol in each SCS as the number of symbols corresponding to the third DRX cycle value included in the specified DRX cycle value in each SCS; or determining a product of a rounded value of a quotient of the third difference value and the duration per symbol in the specified SCS multiplied by a ratio of the number of slots per frame in each SCS to the number of slots per frame in the specified SCS, as the number of symbols corresponding to the third DRX cycle value included in the specified DRX cycle value in each SCS.

11. The method according to claim 1, wherein time domain resource allocation information of each SCS comprises: a duration per slot, the number of symbols per slot, and a duration per symbol, and determining the specified DRX cycle value comprises:

determining a quotient S of the arrival time interval of the any one of the service data and the duration per slot corresponding to each SCS;

determining the number of symbols corresponding to a first DRX cycle value included in the specified DRX cycle value in each SCS, wherein the number of symbols corresponding to the first DRX cycle value included in the specified DRX cycle value in each SCS is a product of an integer part of the S and the number of symbols per slot corresponding to each SCS; and determining the number of symbols corresponding to a second DRX cycle value included in the specified DRX cycle value in each SCS according to a fractional part of the S and the duration per symbol corresponding to each SCS.

12. The method according to claim 1, wherein time domain resource allocation information of each SCS comprises: a duration per symbol, and determining the specified DRX cycle value comprises:

determining a first number of symbols corresponding to a first DRX cycle value included in the specified DRX cycle value in a specified SCS and a second number of symbols corresponding to a second DRX cycle value included in the specified DRX cycle value in the specified SCS;

determining the number of symbols corresponding to the first DRX cycle value included in the specified DRX cycle value in each SCS, wherein the number of symbols corresponding to the first DRX cycle value included in the specified DRX cycle value in each SCS is a product of the first number of symbols multiplied by a ratio of a number of slots per frame in each SCS to the number of slots per frame in the specified SCS; and determining the number of symbols corresponding to the second DRX cycle value included in the specified DRX cycle value in each SCS, wherein the number of symbols corresponding to the second DRX cycle value included in the specified DRX cycle value in each SCS is a product of the second number of symbols multiplied by the ratio of the number of slots per frame in each SCS to the number of slots per frame in the specified SCS.

13. The method according to claim 1, wherein determining the specified DRX cycle value comprises:

determining a first DRX cycle value included in the specified DRX cycle value in each SCS, wherein the first DRX cycle value is a duration corresponding to any one of the default configurable DRX cycle values that is less than the arrival time interval of the any one of the service data;

determining a first difference value between the arrival time interval of the any one of the service data and the first DRX cycle value;

determining a second DRX cycle value included in the specified DRX cycle value, wherein the second DRX cycle value is an integer part of the first difference value;

determining a fourth difference value between the first difference value and the second DRX cycle value; and determining a number of sub-milliseconds corresponding to a third DRX cycle value included in the specified DRX cycle value in each SCS, wherein the number of sub-milliseconds corresponding to the third DRX cycle value included in the specified DRX cycle value in each SCS is a quotient of the fourth difference value and a specified reference coefficient.

14. The method according to claim 1, wherein time domain resource allocation information of each SCS comprises: a duration per symbol, and determining the specified DRX cycle value comprises:

determining a number of symbols included in the specified DRX cycle value in each SCS, wherein the number of symbols included in the specified DRX cycle value in each SCS is a rounded value of a quotient of the arrival time interval of the any one of the service data and the duration per symbol in each SCS; or determining the number of symbols included in the specified DRX cycle value in each SCS, wherein the number of symbols included in the specified DRX cycle value in each SCS is a product of a rounded value of a quotient of the arrival time interval of the any one of the service data and the duration per symbol in a specified SCS multiplied by a ratio of the number of slots per frame in each SCS to a number of slots per frame in the specified SCS.

15. The method according to claim 1, wherein determining the specified DRX cycle value comprises:

determining a rounded value of a quotient of the arrival time interval of any one of the service data and the specified reference coefficient as the count of sub-milliseconds included in the specified DRX cycle value, in a case where the quotient of the arrival time interval of any one of the service data and the specified reference coefficient is not an integer.

16. A method for determining a discontinuous reception (DRX), performed by a user equipment, comprising:

receiving configuration information of the DRX sent by a network device, wherein a specified DRX cycle value contained in the configuration information is different from any one of default configurable DRX cycle values; and monitoring a control channel based on the specified DRX cycle;

wherein the specified DRX cycle value comprises a count of sub-milliseconds, and the sub-millisecond is a time measuring unit less than a millisecond;

wherein the count of sub-milliseconds comprised in the specified DRX cycle value is determined by the network device according to a quotient of a arrival time interval of any one of service data and a specified reference coefficient in response to the arrival time interval of any one of the service data being different from any one of the default configurable DRX cycle values.

17. The method according to claim 16, further comprising:

determining a number of symbols corresponding to a currently activated BWP according to a ratio of a SCS of the currently activated BWP to a SCS of a BWP in the configuration information, and the number of symbols included in the specified DRX cycle value, wherein the currently activated BWP is different from the BWP in the configuration information; or determining the number of symbols corresponding to a currently activated BWP according to a SCS of the currently activated BWP and the number of symbols included in the specified DRX cycle value; or determining the number of symbols corresponding to a currently activated cell according to a SCS of the currently activated cell and the number of symbols included in the specified DRX cycle value; or determining the number of symbols corresponding to a currently activated cell according to a ratio of a SCS of the currently activated cell to a SCS of a cell in the configuration information, and the number of symbols included in the specified DRX cycle value wherein the currently activated cell is different from the cell in the configuration information.

18. The method according to claim 16, wherein the count of sub-milliseconds comprised in the specified DRX cycle value is a rounded value of a quotient of the arrival time interval of any one of the service data and the specified reference coefficient, in a case where the quotient of the arrival time interval of any one of the service data and the specified reference coefficient is not an integer.

19. A communication device, comprising:

a transceiver;

a memory; and a processor, wherein the processor is connected to the transceiver and the memory respectively, and configured to control a transmission and a reception of a wireless signal of the transceiver and cause a method for determining a discontinuous reception (DRX) to be implemented by executing computer-executable instructions on the memory, wherein the method comprises:

sending configuration information of the DRX to a user equipment, wherein a specified DRX cycle value contained in the configuration information is different from any one of default configurable DRX cycle values;

wherein the specified DRX cycle value comprises a count of sub-milliseconds, and the sub-millisecond is a time measuring unit less than a millisecond;

wherein the method further comprises:

determining the specified DRX cycle value according to an arrival time interval of any one of service data, wherein the arrival time interval of any one of the service data is different from any one of the default configurable DRX cycle values;

wherein determining the specified DRX cycle value comprises:

determining the count of sub-milliseconds comprised in the specified DRX cycle value, wherein the count of sub-milliseconds included in the specified DRX cycle value is a quotient of the arrival time interval of any one of the service data and a specified reference coefficient.

20. A communication device, comprising:

a transceiver;

a memory; and a processor, wherein the processor is connected to the transceiver and the memory respectively, and configured to control a transmission and a reception of a wireless signal of the transceiver and cause the method for determining the DRX according to claim 16 to be implemented by executing computer-executable instructions on the memory.

* * * * *